United States Patent
Kim et al.

(10) Patent No.: US 9,143,294 B2
(45) Date of Patent: Sep. 22, 2015

(54) METHOD OF USING COMPONENT CARRIER BY RELAY STATION IN MULTI-CARRIER SYSTEM AND RELAY STATION

(75) Inventors: Hak Seong Kim, Anyang-si (KR); Byoung Hoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 257 days.

(21) Appl. No.: 13/391,876

(22) PCT Filed: Aug. 31, 2010

(86) PCT No.: PCT/KR2010/005863
§ 371 (c)(1),
(2), (4) Date: Feb. 23, 2012

(87) PCT Pub. No.: WO2011/025340
PCT Pub. Date: Mar. 3, 2011

(65) Prior Publication Data
US 2012/0163288 A1     Jun. 28, 2012

Related U.S. Application Data

(60) Provisional application No. 61/238,217, filed on Aug. 31, 2009, provisional application No. 61/255,498, filed on Oct. 28, 2009.

(51) Int. Cl.
*H04W 88/04* (2009.01)
*H04L 5/00* (2006.01)
*H04B 7/26* (2006.01)

(52) U.S. Cl.
CPC ............ *H04L 5/0037* (2013.01); *H04L 5/0094* (2013.01); *H04B 7/2606* (2013.01)

(58) Field of Classification Search
CPC ..... H04W 88/04; H04W 72/04; H04W 88/12; H04W 88/16
See application file for complete search history.

(56) References Cited

U.S. PATENT DOCUMENTS

2008/0070582 A1* 3/2008 Cai ............................... 455/450
(Continued)

FOREIGN PATENT DOCUMENTS

| KR | 10-2005-0020886 A | 3/2005 |
| KR | 10-2006-0070780 A | 6/2006 |
| KR | 10-2008-0014421 A | 2/2008 |

OTHER PUBLICATIONS

IEEE Std 802.16j-2009, "Part 16: Air Interface for Broadband Wireless Access Systems—Amendment 1: Multihop Relay Specification", Jun. 12, 2009.
(Continued)

*Primary Examiner* — Anez Ebrahim
(74) *Attorney, Agent, or Firm* — Birch, Stewart, Kolasch & Birch, LLP

(57) ABSTRACT

A method of using component carrier by a relay station in a multi-carrier system comprises: receiving a component carrier (CC) link configuration information from a base station (BS); allocating a CC to at least one of a backhaul link between the BS and the RS and an access link between the RS and an RS user equipment (UE) according to the CC link configuration information; and transmitting or receiving a signal by using the CC in the allocated link.

11 Claims, 27 Drawing Sheets

(56) References Cited

U.S. PATENT DOCUMENTS

| | | | |
|---|---|---|---|
| 2008/0227386 A1* | 9/2008 | Dayal et al. | 455/7 |
| 2009/0147706 A1* | 6/2009 | Yu et al. | 370/277 |
| 2009/0232085 A1* | 9/2009 | Boyer et al. | 370/330 |
| 2010/0046418 A1* | 2/2010 | Horn et al. | 370/315 |
| 2011/0051654 A1* | 3/2011 | Blankenship et al. | 370/315 |
| 2011/0051656 A1* | 3/2011 | Hethuin et al. | 370/315 |

OTHER PUBLICATIONS

Mogensen et al., "LTE-Advanced: The Path towards Gigabit/s in Wireless Mobile Communications", Wireless Vitae 2009, pp. 147-151, May 20, 2009.

Parkvall et al., "The Evolution of LTE towards IMT-Advanced", Journal of Communications, vol. 4, No. 3, pp. 146-154, Apr. 2009.

* cited by examiner

METHOD OF USING COMPONENT CARRIER BY RELAY STATION IN MULTI-CARRIER SYSTEM AND RELAY STATION

CROSS REFERENCE TO RELATED APPLICATIONS

This application is the National Phase of PCT/KR2010/005863 filed on Aug. 31, 2010, which claims priority under 35 U.S.C. 119(e) to U.S. Provisional Application Nos. 61/238,217 filed on Aug. 31, 2009 and 61/255,498 filed on Oct. 28, 2009, all of which are hereby expressly incorporated by reference into the present application.

TECHNICAL FIELD

The present invention relates to wireless communication and, more particularly, to a method of using a component carrier by a relay station in a system using multi-carriers and a relay station using the same.

BACKGROUND ART

International Telecommunication Union Radio (ITU-R) communication sector is proceeding with standardization of an International mobile telecommunication (IMT)-Advanced, a next-generation mobile communication system following the $3^{rd}$-generation. The IMT-Advanced aims at supporting Internet protocol (IP)-based multimedia services at a data rate of 1 Gbps in a stationary and low-speed movement state and at a data rate of 100 Mbps in a high speed movement state.

$3^{rd}$-generation partnership project (3GPP) is preparing long term evolution (LTE)-Advanced, a system standard that meets the requirements of the IMT-Advanced, by improving the LTE which is based on an orthogonal frequency division multiple access (OFDMA)/single carrier-frequency division multiple access (SC-FDMA) transmission scheme. The LTE-advanced is one of potential candidates for the IMT-Advanced. A major technique of the LTE-Advanced includes a relay station technique.

A relay station is a device for relaying signals between a base station and a terminal, which is used to extend a cell coverage and improve throughput of a wireless communication system.

In a multi-carrier system, the relay station may use a plurality of component carriers in a backhaul link with a base station or in an access link with a relay station terminal. In this case, however, the state of a wireless channel of each component carrier changes, and a data transfer amount required by the backhaul link, a data transfer amount required by the access link, and the like, also changes.

In addition, a subframe structure of a control channel or a data channel transmitted in a particular component carrier of the relay station is likely to vary depending on whether or not the component carrier of the relay station is used for one of the backhaul link or the access link or it is used for both the backhaul link and the access link.

Thus, in consideration of these facts, a method allowing a relay station to effectively use a particular component carrier in a backhaul link and an access link, and a relay station using the method are required.

SUMMARY OF INVENTION

Technical Problem

Therefore, an object of the present invention is to provide a method of using a component carrier by a relay station in a multi-carrier system and a relay station using the same.

Solution to Problem

A method of using component carrier by a relay station in a multi-carrier system according to an aspect of the present invention includes receiving component carrier (CC) link configuration information from a base station (BS); allocating a CC to at least one of a backhaul link between the BS and the RS and an access link between the RS and an RS user equipment (UE) according to the CC link configuration information; and transmitting or receiving a signal by using the CC in the allocated link.

The CC link configuration information comprises information regarding a link, starting from a particular point in time, applied to each of CC which have been already allocated to a backhaul downlink or an access downlink of the RS.

When a first CC is used for the backhaul downlink of the RS and the first CC and a second CCs are used for the access downlink of the RS, the CC link configuration information is transmitted via a control channel or a data channel of the first CC.

The control channel of the first CC is transmitted in an OFDM symbol following a certain number of first OFDM symbols of a subframe. The data channel of the first CC is transmitted in an OFDM symbol following the OFDM symbol to which the control channel is allocated.

The CC link configuration information comprises information indicating that the first CC is not used for the access downlink. When the CC link configuration information is received, the RS uses the first CC only in the backhaul link, and the control channel and data channel of the first CC have the same subframe structure as that of a control channel and a data channel transmitted by the BS to a macro UE.

When a first CC and a second CC are used for the backhaul downlink of the RS and the first CC is used for the access downlink of the RS, the CC link configuration information is transmitted via the control channel or the data channel of the first CC. The CC link configuration information comprises information indicating that the first CC is not used for the access downlink and information indicating that the second CC is not used for the backhaul downlink.

When the first CC is used only for the backhaul downlink and the second CC is used only for the access downlink according to the CC link configuration information, the control channel and the data channel transmitted through the first CC and the second CC have the same subframe structure as the control channel and the data channel transmitted by the BS to the macro UE.

When the CC link configuration information is transmitted via the control channel of the first CC, the CC link configuration information comprise link configuration information regarding both the first and second CCs.

The control channel of the first CC comprises scheduling information regarding the data channel of the first CC and the data channel of the second CC in the backhaul downlink of the RS.

A relay station according to another aspect of the present invention includes an RF unit transmitting and receiving a radio signal; and a processor coupled to the RF unit, wherein the processor receives a component carrier (CC) link configuration information from a base station (BS), allocates a CC to at least one of a backhaul link between the BS and the relay station (RS) and an access link between the RS and an RS user equipment (UE) according to the CC link configuration information, and transmits or receives a signal by using the CC in the allocated link.

Advantageous Effects of Invention

According to exemplary embodiments of the present invention, in a multi-carrier system, a relay station is capable of configuring different component carriers to be applied to a backhaul link and an access link depending on a channel state or the amount of data to be transmitted. Therefore, the component carriers, limited, high-priced radio resources, can be effectively used.

MODE FOR THE INVENTION

The following technique can be used for various wireless communication systems such as CDMA (code division multiple access), FDMA (frequency division multiple access), TDMA (time division multiple access), OFDMA (orthogonal frequency division multiple access), SC-FDMA (single carrier-frequency division multiple access), and the like. CDMA may be implemented as radio technology such as UTRA (Universal Terrestrial Radio Access) or CDMA2000. TDMA may be implemented as radio technology such as GSM (Global System for Mobile communications)/GPRS (General Packet Radio Service)/EDGE (Enhanced Data Rates for GSM Evolution). OFDMA may be implemented as radio technology such as IEEE 802.11 (Wi-Fi), IEEE 802.16e (WiMAX), IEEE 802-20, E-UTRA (Evolved UTRA), and the like. UTRA is part of UMTS (Universal Mobile Telecommunications System). 3GPP (3rd Generation Partnership Project) LTE (long term evolution) is part of E-UMTS (Evolved UMTS) using E-UTRA, which employs OFDMA for downlink and SC-FDMA for uplink. LTE-A has evolved from 3GPP LTE. Hereinafter, 3GPP LTE/LET-A will be described as an example, but the technical features of the present invention is not limited thereto.

Figure 1:
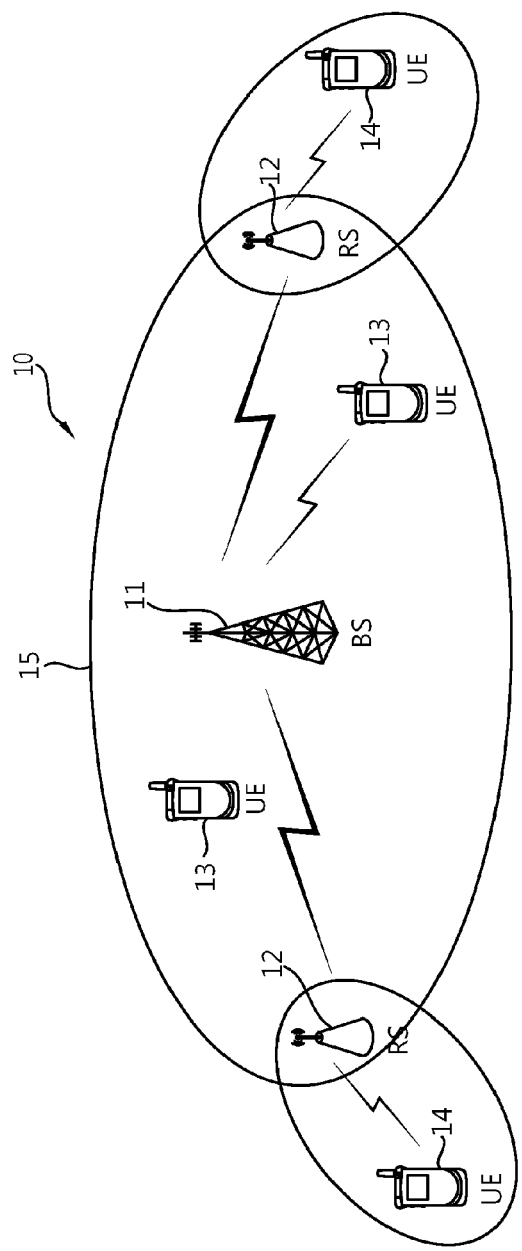
FIG. 1 illustrates a wireless communication system including a relay station.

FIG. 1 illustrates a wireless communication system including relay station (RS).

With reference to FIG. 1, the wireless communication system 10 including RS includes at least one base station (BS) 11. Each BS 11 provides a communication service to a geographical area 15 generally called a cell. Cell may be divided into a plurality of areas, and each area is called a sector. One or more cells may exist within the coverage of a single BS. The BS 11 generally refers to a fixed station that communicates with user equipment (UE) 13 and may be called by other terminologies such as evolved NodeB (eNB), base transceiver system (BTS), access point (AP), access network (AN), etc. The BS 11 performs functions such as connectivity, management, control, and resource allocation between a relay station (RS) 12 and a UE 14.

The RS 12 refers to a device that relays a signal between the BS 11 and the UE 14 and may be called by other terminologies such as relay node (RN), repeater, relay, etc. The RS 12 may use any relay scheme such as amplify and forward (AF), decode and forward (DF), and the like, and the technical features of the present invention is not limited thereto.

The UEs 13 and 14 may be fixed or mobile, which may be referred to by other terminologies such as mobile station (MS), user terminal (UT), subscriber station (SS), wireless device, personal digital assistant (PDA), wireless modem, handheld device, access terminal (AT), etc. Hereinafter, a macro UE (Ma UE) 13 refers to a UE that directly communicates with the BS 11, and a relay station UE (RS UE) 14 refers to a UE that communicates with the RS 12. Even the macro UE 13 within the cell of the BS 11 may communicate with the BS 11 through the RS 12 in order to improve a transfer rate according to a diversity effect.

Hereinafter, a link between the BS 11 and the macro UE 13 will be referred to as a macro link. The macro link may be divided into a macro downlink and a macro uplink. The macro downlink (M-DL) refers to communication from the BS 11 to the macro UE 13, and the macro uplink (M-UL) refers to communication from the macro UE 13 to the BS 11.

A link between the BS 11 and the RS 12 will be referred to as a backhaul link. The backhaul link may be divided into a backhaul downlink (B-DL) and a backhaul uplink (B-UL). The backhaul downlink refers to communication from the BS 11 to the RS 12, and the backhaul uplink refers to communication from RS 12 to the BS 11.

A link between the RS 12 and the RS UE 14 will be referred to as an access link. The access link may be divided into an access downlink (A-DL) and an access uplink (A-UL). The access downlink refers to communication from the RS 12 to the RS UE 14, and the access uplink refers to communication from the RS UE 14 to the RS 12.

The wireless communication system 10 including RSs supports bi-directional communications. The bi-directional communications may be performed by using a time division duplex (TDD) mode, a frequency division duplex (FDD) mode, and the like. The TDD mode uses different time resources in uplink transmission and downlink transmission. The FDD mode uses different frequency resources in uplink transmission and downlink transmission.

Figure 2:
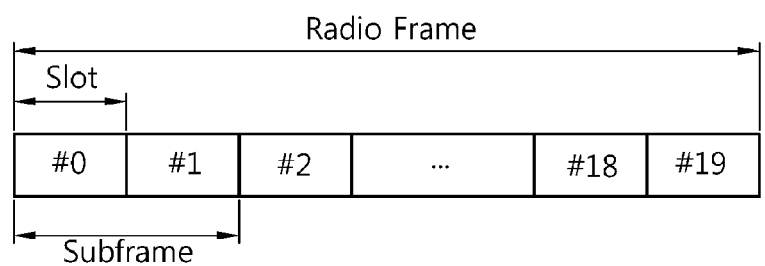
FIG. 2 illustrates the structure of a radio frame of 3GPP LTE.

FIG. 2 shows the structure of a radio frame of 3GPP LTE.

With reference to FIG. 2, a radio frame includes ten subframes, and one subframe includes two slots. The length of one subframe Is 1 ms, and the length of one slot is 0.5 ms. Time taken for transmitting one subframe is called a transmission time interval (TTI). TTI may be a minimum unit of scheduling.

One slot may include a plurality of orthogonal frequency division multiplexing (OFDM) symbols in a time domain. Because 3GPP LTE use OFDMA in downlink, the OFDM symbol is to express a single symbol period, which, thus, can be called by other names depending on multiple access schemes. For example, when an SC-FDMA is used as an uplink multiple access scheme, the symbol may be an SC-FDMA symbol.

It is illustrated that one slot includes seven OFDM symbols, but the number of OFDM symbols included in one slot may vary depending on the length of a cyclic prefix (CP). According to 3GPP TS 36.211 V8.5.0 (2008-12), one subframe includes seven OFDM symbols in a normal CP, and one subframe includes six OFDM symbols in an extended CP. The structure of the radio frame is merely illustrative, and the number of subframes included in the radio frame and the number of slots included in a subframe can be modified. Hereinafter, a symbol may refer to a single OFDM symbol or a single SC-FDMA symbol.

The structure of the radio frame described with reference to FIG. 2 may refer to sections 4.1 and 4.2 of "Technical Specification Group Radio Access Network; Evolved Universal Terrestrial Radio Access (E-UTRA); Physical Channels and Modulation (Release 8)" of 3GPP TS 36.211 V8.3.0 (2008-05).

Figure 3:
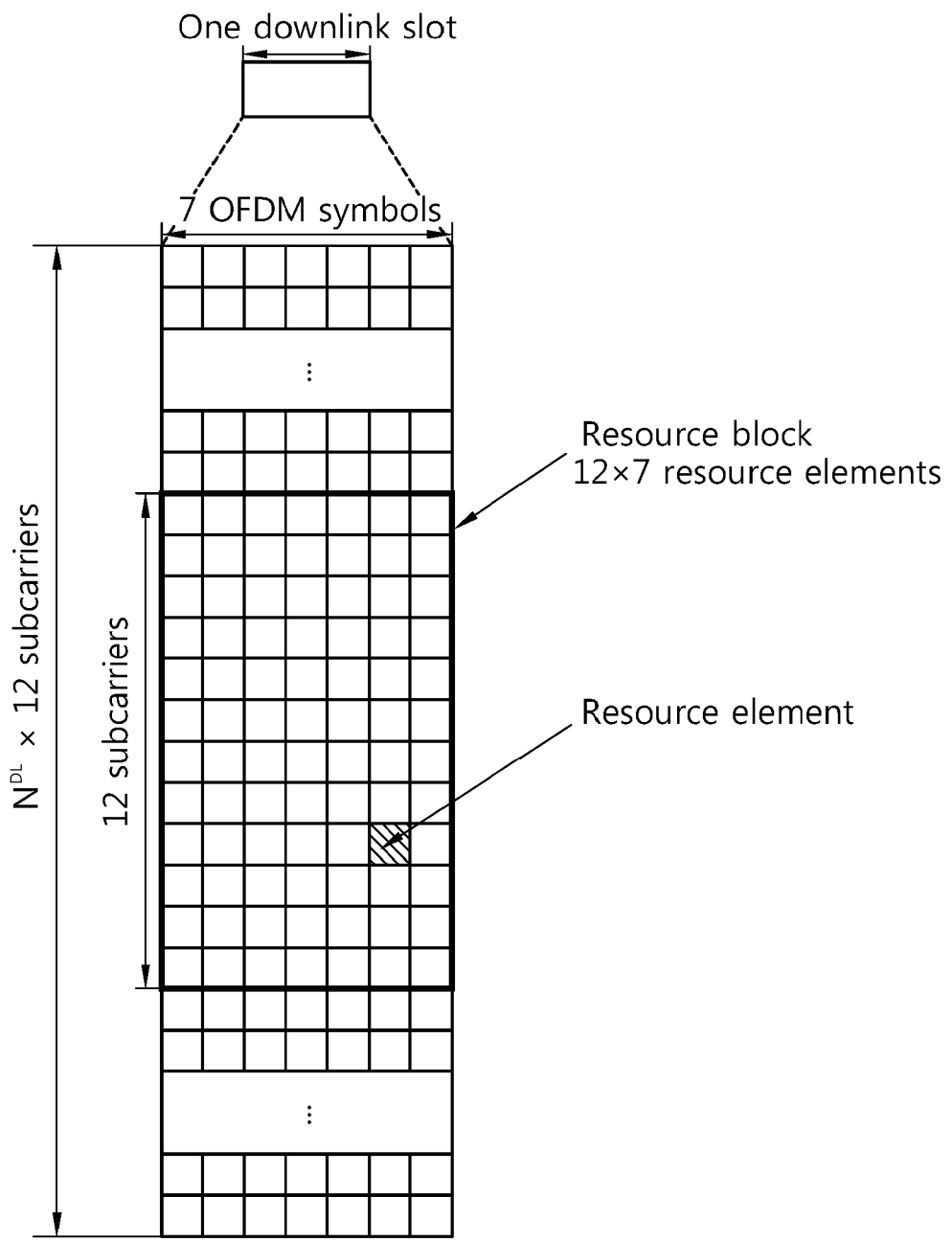
FIG. 3 illustrates a resource grid of a single downlink slot.

FIG. 3 illustrates a resource grid of a single downlink slot.

In a radio frame used for FDD or TDD, one slot includes a plurality of OFDM symbols in a time domain and a plurality of resource blocks (RBs) in a frequency domain. A resource block, a resource allocation unit, includes a plurality of contiguous subcarriers in one slot.

With reference to FIG. 3, it is illustrated that one downlink slot includes seven OFDM symbols and one resource block includes twelve subcarriers in the frequency domain, but the present invention is not limited thereto. The subcarriers may have an interval of, for example, 15 KHz in the resource block.

Each element on the resource grid is called a resource element, and one resource block includes 12×7 number of resource elements. The number $N^{DL}$ of resource blocks included in a downlink slot is dependent upon a downlink transmission bandwidth configuration in a cell. The resource grid described with reference to FIG. 3 may be applicable to an uplink.

Figure 4:
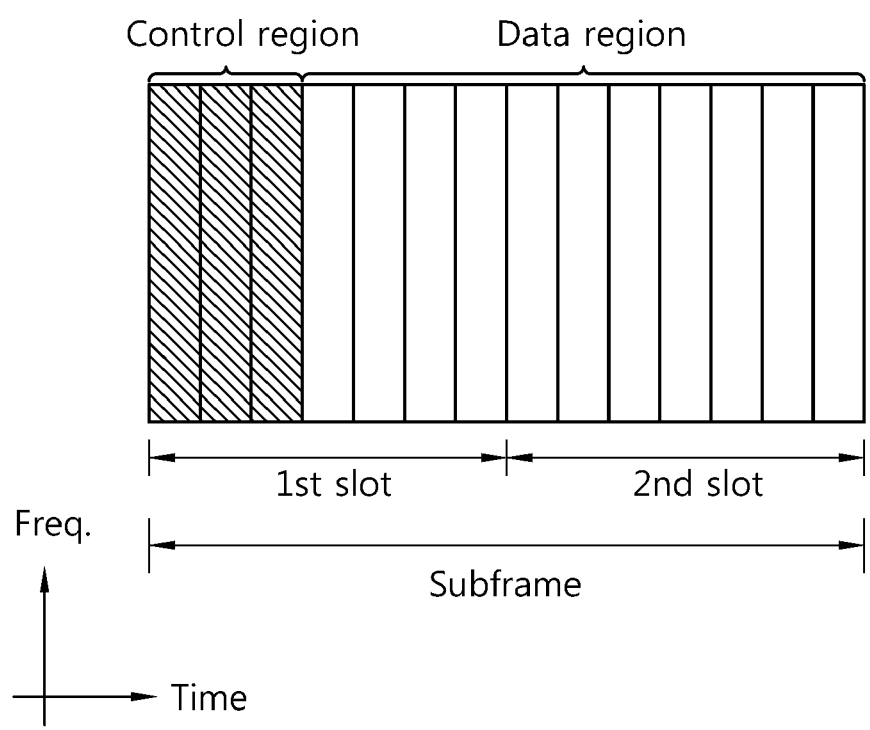
FIG. 4 illustrates the structure of a downlink subframe.

FIG. 4 illustrates the structure of a downlink subframe.

With reference to FIG. 4, a subframe includes two consecutive slots. First three OFDM symbols of a first slot in the subframe correspond to a control region to which a physical downlink control channel (PDCCH) is allocated, and the other remaining OFDM symbols correspond to a data region to which a physical downlink shared channel (PDSCH) is allocated. Besides the PDCCH, a physical control format indicator channel (PCFICH), a physical HARQ indicator channel (PHICH), and the like, may be allocated to the control region. A UE decodes control information transmitted via the PDCCH to read data information transmitted via the PDSCH. Here, inclusion of three OFDM symbols in the control region is merely illustrative, and two OFDM symbols or one OFDM symbol may be included in the control region. The number of OFDM symbols included in the control region of the subframe may be known through the PCFICH. The PHICH carries information indicating whether or not uplink data transmitted by the UE has been successfully received.

The control region includes a logical control channel element (CCE) column, a plurality of CCEs. The CCE column is a set of the entire CCEs constituting the control region in one subframe. The CCE corresponds to a plurality of resource element groups. For example, the CCE may correspond to nine resource element groups. The resource element groups are used to define mapping of control channels. For example, one resource element group may include four resource elements.

A plurality of PDCCHs may be transmitted within the control region. The PDCCH carries control information such as a schedule allocation. The PDCCH is transmitted on an aggregation of one or some consecutive CCEs. A format and the number of bits of available PDCCHs are determined according to the number of CCEs constituting the CCE aggregation. The number of CCEs used for a PDCCH transmission is called a CCE aggregation level. Further, the CCE aggregation level is a CCE unit for searching for PDCCHs. The size of the CCE aggregation level is defined by the number of contiguous CCEs. For example, the CCE aggregation level may be elements of {1, 2, 4, 8}.

The control information transmitted via the PDCCH is called downlink control information (DCI). The DCI includes uplink scheduling information, downlink scheduling information, system information, an uplink power control command, control information for paging, control information for indicating a random access response (RACH response), and the like.

DIC formats may include format 0 for physical uplink shared channel (PUSCH) scheduling, format 1 for scheduling one physical downlink shared channel (PDSCH) codeword, format 1A for compact-scheduling one PDSCH codeword, format 1B for compact-scheduling with respect to rank-1 transmission of a single codeword in a spatial multiplexing mode, format 1C for very compact-scheduling a downlink shared channel (DL-SCH), format 1D for PDSCH scheduling in a multi-user spatial multiplexing mode, format 2 for PDSCH scheduling in a closed-loop spatial multiplexing mode, format 2A for PDSCH scheduling in an open-loop spatial multiplexing mode, format 3 for transmitting a transmission power control (TPC) command of controlling 2-bit power for a PUCCH and PUSCH, format 3A for transmitting a TPC command of controlling 1-bit power for a PUCCH and PUSCH, and the like.

Figure 5:
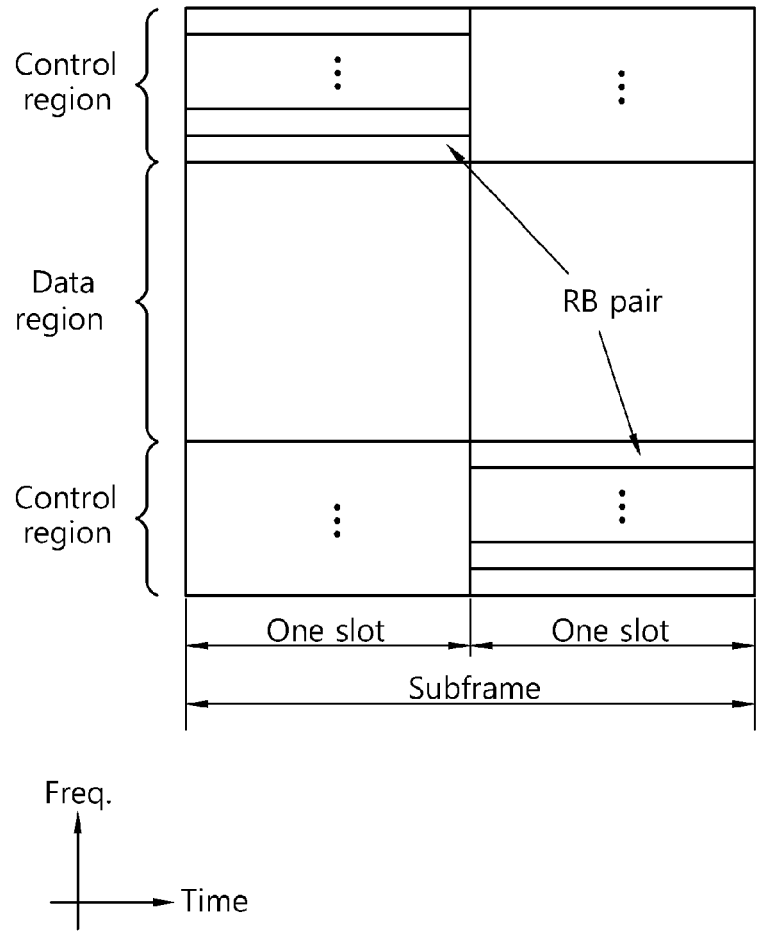
FIG. 5 illustrates the structure of an uplink subframe.

FIG. 5 illustrates the structure of an uplink subframe.

With reference to FIG. 5, an uplink subframe may be divided into a control region to which a physical uplink control channel (PUCCH) that carries uplink control information is allocated and a data region to which physical uplink shared channel (PUSCH) that carries user data is allocated in the frequency domain.

In the subframe, a pair of RBs are allocated to the PUCCH with respect to one UE, and the RBs belonging to the pair of RBs occupy different subcarriers in each of two slots. The pair of RBs allocated to the PUCCH are frequency-hopped at a slot boundary.

The PUCCH may support multiple formats. Namely, it can transmit uplink control information having different number of bits per subframe according to a modulation scheme. For example, when binary phase shift keying (BPSK) is in use (PUCCH format 1*a*), 1-bit uplink control information may be transmitted on the PUCCH, and when quadrature phase shift keying (QPSK) is in use (PUCCH format 1*b*), 2-bit uplink control information may be transmitted on the PUCCH. Besides, the PUCCH format may include format 1, format 2, format 2*a*, format 2*b*, and the like (This may refer to section 5.4 of "Technical Specification Group Radio Access Network; Evolved Universal Terrestrial Radio Access (E-UTRA); Physical Channels and Modulation (Release 8)" of 3GPP TS 36.211 V8.2.0 (2008-03).

A multi-carrier system will now be described.

The existing 3GPP LTE system supports a case in which a downlink bandwidth and an uplink bandwidth are set to be different, but this supposes one carrier. Namely, it means that the 3GPP LTE system supports only a case in which a downlink bandwidth and an uplink bandwidth are different in a state that one carrier is defined for uplink and downlink, respectively. For example, the 3GPP LTE system supports a maximum 20 MHz and the uplink bandwidth and downlink bandwidth may be different, but only one carrier is supported in the uplink and downlink.

Meanwhile, the multi-carrier system supports a carrier aggregation. The carrier aggregation means that a plurality of narrowband component carriers (CC) may be aggregated to form a broadband. The carrier aggregation can support increased throughput by extending a transmission bandwidth, prevent an increase in cost otherwise caused by an introduction of a broadband radio frequency (RF) element, and guarantee compatibility with the existing system. The extension of a transmission bandwidth can support a bandwidth of a maximum 100 MHz by aggregating, for example, five CCs having a bandwidth of 20 MHz.

The carrier aggregation can be divided into a contiguous carrier aggregation in which aggregation is made among consecutive carriers and a non-contiguous carrier aggregation in which aggregation is made among inconsecutive carriers in the frequency domain. The non-contiguous carrier aggregation is also called a spectrum aggregation.

The bandwidth of each of the CCs used for the carrier aggregation may be the same or different. For example, two 20 MHz CCs may be used to configure a 40 MHz band, or one 20 MHz CC and two 10 MHz CCs may be used to configure a 40 MHz band.

Also, a total of bandwidths used for uplink and a total of bandwidths used for downlink may be the same or different. For example, three 20 MHz CCs, totaling 60 MHz bandwidth, may be used for uplink, and five 20 MHz CCs, totaling 100 MHz bandwidth, may be used for downlink. Hereinafter, the multi-carrier system refers to a system for supporting a plurality of carriers based on the carrier aggregation.

Figure 6:
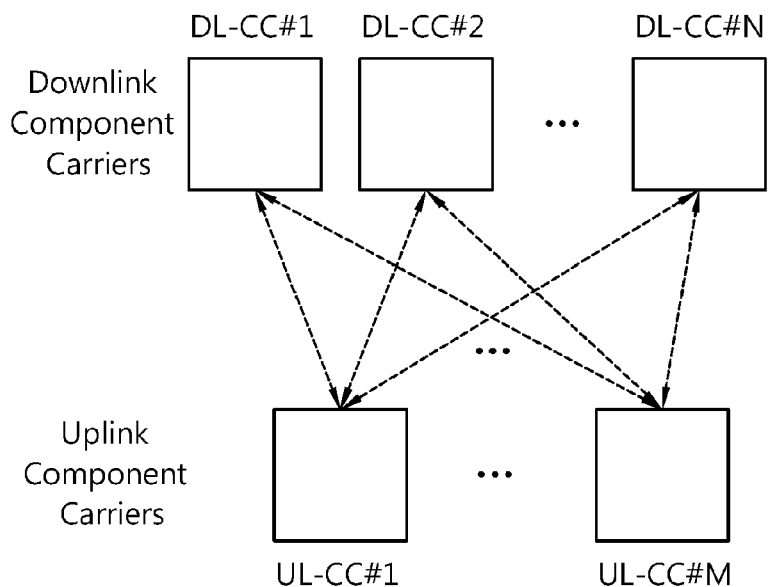
FIG. 6 illustrates component carriers used in a multi-carrier system.

FIG. 6 illustrates component carriers used in the multi-carrier system.

In FIG. 6, DL-CC#1 to DL-CC#N (N is a natural number) indicate downlink CCs, and UL-CC#1 to UL-CC#M (M is a natural number) indicate uplink CCs. Each CC may have various values of frequency bands. For example, each CC may have a value of 10 MHz or 20 MHz. The N and M may be the same or different. Hereinafter, it is assumed that N is greater than M. Downlink CCs and uplink CCs may be used for a backhaul link between a BS and an RS.

Figure 7:
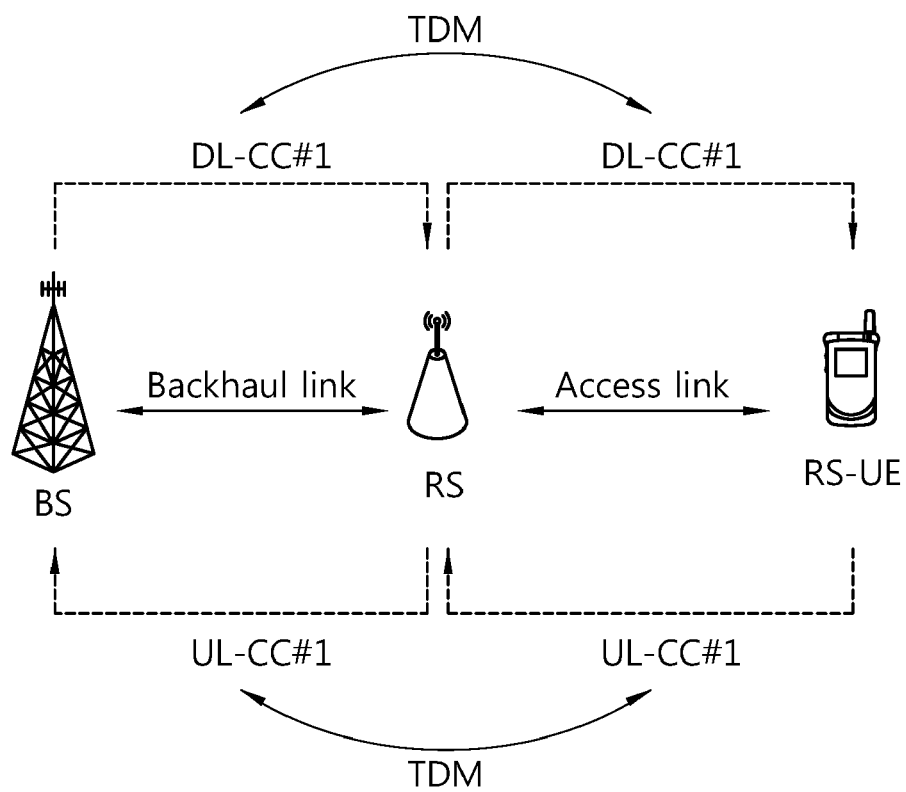
FIG. 7 illustrates the conventional method of operating a backhaul link and an access link in case of employing a relay station.

FIG. 7 illustrates the conventional method of operating a backhaul link and an access link in case of employing a relay station.

With reference to FIG. 7, the DL-CC#1 may be used for each different time and cannot be used at the same time in a BS-RS link and an RS-RS UE link. Namely, one carrier is operated in a TDM manner in a backhaul downlink and an access downlink.

Also, the UL-CC#1 are used for each different time and cannot be used at the same time. Namely, one carrier is operated in a TDM manner in the backhaul link and an access uplink.

Such a conventional method has a problem in that there is a subframe in which the RS cannot receive a signal from the BS. For example, in a 3GPP LTE FDD system, the RS cannot receive a signal in subframes 0, 4, 5, and 9, from the BS. The reason is because the RS must transmit essential signals such as a primary synchronization signal (PSS), a secondary synchronization signal (SSS), and a paging message in subframes 0, 4, 5, and 9.

When HARQ is applied in the FDD, the UE transmits an ACK/NACK in a subframe n with respect to data received in a subframe n−4. And, the UE receives new data or retransmission data in a subframe (n+4) according to the ACK/NACK. When this HARQ method is applied as it is to the RS, there is subframes in which the RS cannot receive data from the BS, so the method is problematic.

Figure 8:
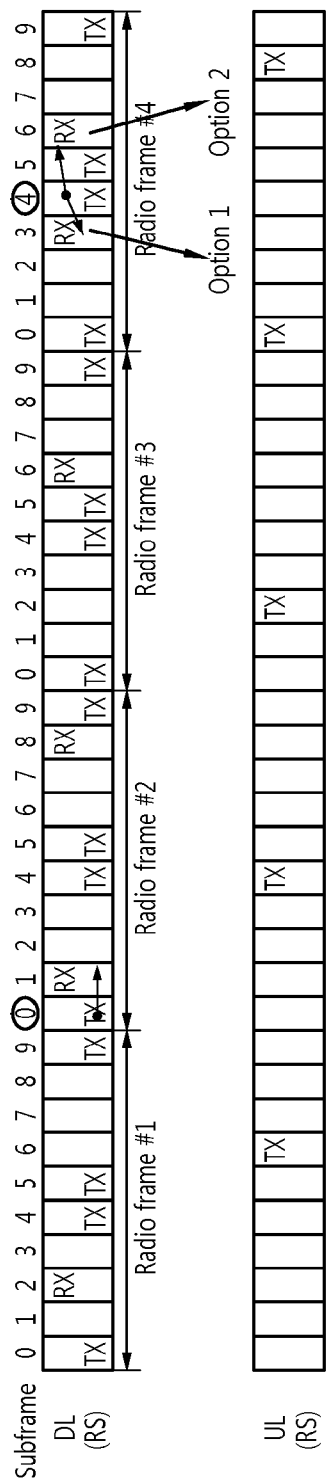
FIG. 8 illustrates subframes in which a signal cannot be received from a BS when the relay station performs HARQ and subframes, in the place of the subframes, in which a signal can be received.

FIG. 8 illustrates subframes in which a signal cannot be received from a BS when the relay station performs HARQ and subframes, in the place of the subframes, in which a signal can be received.

In FIG. 8, subframe indexes of each radio frame are indicated as 0 to 9. The RS can receive backhaul downlink data in subframe 6 of a third DL radio frame. Then, the RS can transmit an ACK/NACK with respect to the backhaul downlink data in subframe 0 of a fourth UL radio frame. The RS is to receive new backhaul downlink data or retransmission backhaul downlink data with respect to the ACK/NACK in subframe 4 of a fourth DL radio frame. However, as discussed above, the FDD has a restriction that the RS cannot receive a signal from the BS in subframes 0, 4, 5, and 9. Thus, the RS can receive backhaul downlink data in subframe 3 (option 1), a previous reception-available subframe before subframe 4, or subframe 6 (option 2), a next reception-available subframe.

Figure 9:
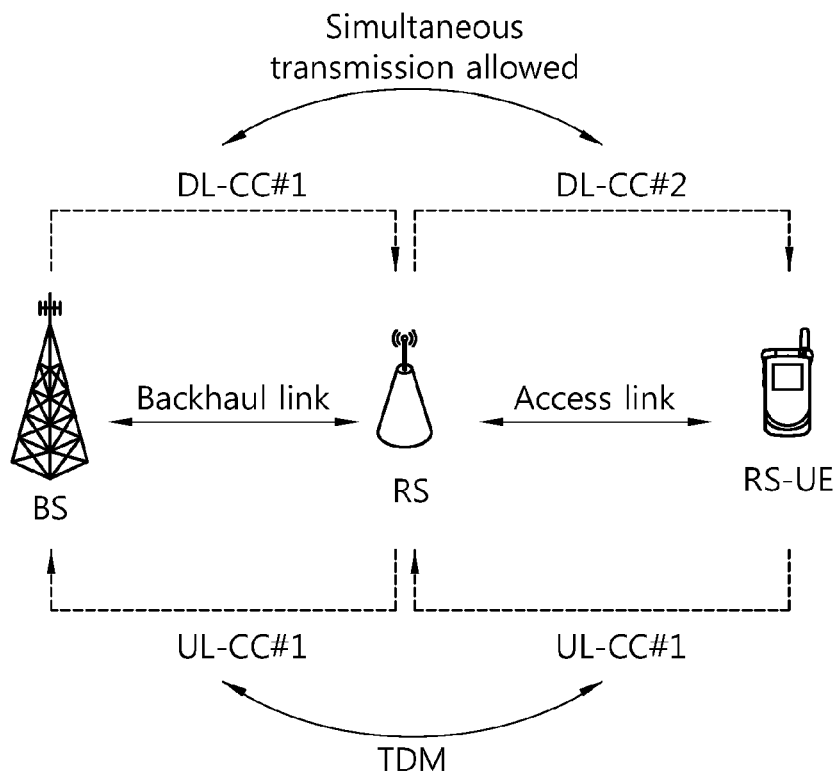
FIG. 9 illustrates a method for operating carriers in a backhaul link when a plurality of downlink component carriers and a single uplink component carrier are used according to a first exemplary embodiment of the present invention.

FIG. 9 illustrates a method for operating carriers in the backhaul link when a plurality of downlink component carriers and a single uplink component carrier are used according to a first exemplary embodiment of the present invention.

As shown in FIG. 9, when a plurality of downlink CCs can be used in the wireless communication system, some of the downlink CCs may be used for the backhaul downlink and the other remaining downlink CCs may be used for the access downlink. The uplink CCs may be used in a TDM manner in the backhaul uplink and the access uplink.

For example, when two downlink CCs (DL-CC#1, DL-CC#2) are available, one downlink CC (DL-CC#1) may be used for the backhaul downlink and the other downlink CC (DL-CC#2) may be used for the access downlink. In this case, the DL-CC#1 and DL-CC#2 may have different frequency bands. Thus, the DL-CC#1 and DL-CC#2 can be used simultaneously. Then, the RS can receive a signal even in the subframe indexes 0, 4, 5, and 9 from the BS and can perform access downlink transmission in every subframe.

A downlink grant regarding a backhaul downlink transmission or an uplink grant regarding a backhaul uplink transmission can be transmitted in the DL-CC#1 used for the backhaul downlink. In this case, the downlink grant or the uplink grant may be transmitted by using a channel of the same type as that of the PDCCH used between the BS and the UE. Also, the downlink grant or the uplink grant may be transmitted through an R-PDCCH. Here, the R-PDCCH refers to a control channel through which a half-duplex (HD) RS, not allowed for simultaneously transmitting and receiving a signal at the same frequency band, receives control information from the BS. The R-PDCCH can be applied to a subframe having a smaller number of available OFDM symbols than those of the subframe in which the BS transmits a downlink signal to the UE, and has a subframe whose internal structure is different from that of the PDCCH. Namely, the R-PDCCH may be allocated to consecutive OFDM symbols (e.g., two or three OFDM symbols) after a certain number of first OFDM symbols, e.g., first two OFDM symbols, in a subframe. In the following, the downlink grant or the uplink grant may be transmitted via the PDCCH or the R-PDCCH, and in what kind of channel type the uplink grant or the downlink grant is to be transmitted can be informed to the RS through higher layer signaling (e.g., radio resource control (RRC) message) or may be previously set to be operated. An R-PDSCH refers to a data channel via which the RS receives data (which includes control information according to circumstances) from the BS. The R-PDSCH may be transmitted in OFDM symbols after the OFDM symbols in which the R-PDCCH is transmitted.

Figure 10:
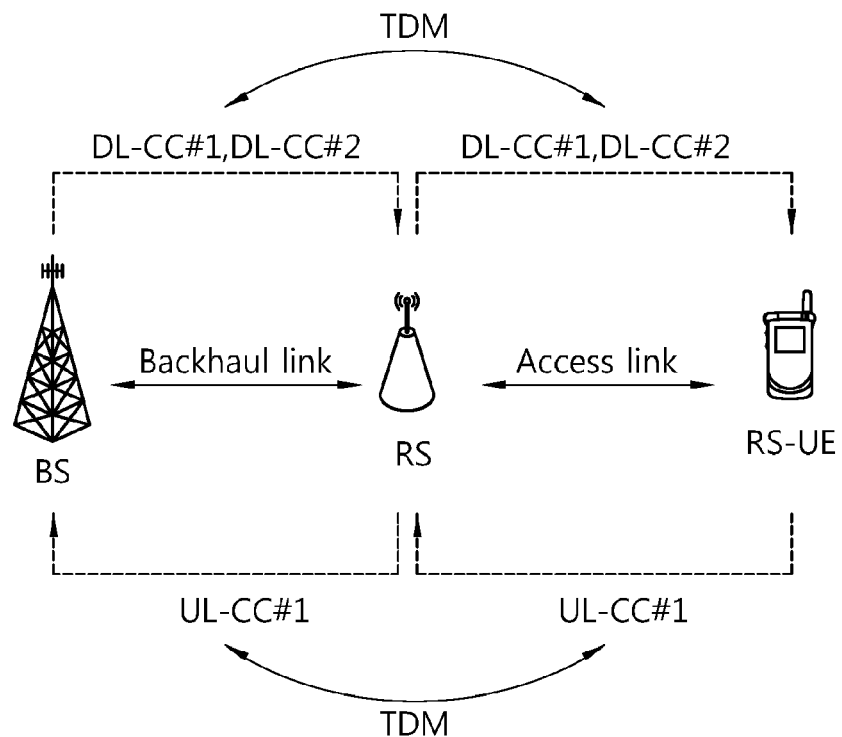
FIG. 10 illustrates a method for operating carriers in a backhaul link when a plurality of downlink component carriers and a single uplink component carrier are used according to a second exemplary embodiment of the present invention.

FIG. 10 illustrates a method for operating carriers in the backhaul link when a plurality of downlink component carriers and a single uplink component carrier are used according to a second exemplary embodiment of the present invention.

With reference to FIG. 10, when a plurality of downlink CCs can be used in the wireless communication system, the entire downlink CCs may be used for the backhaul downlink and the access downlink, and in this case, the downlink CCs may be used in the TDM manner for the backhaul downlink and the access downlink. In this method, the subframes having subframe indexes 0, 4, 5, and 9 cannot be used for the RS to receive a signal from the BS.

The RS may receive backhaul downlink data from two downlink CCs, and in this case, there is a problem in that an ACK/NACK with respect to the backhaul downlink data is to be transmitted through a single uplink CC. Thus, in order to solve this problem, the RS may bundle or multiplex ACK/NACKs with respect to the backhaul downlink data transmitted from the plurality of downlink CCs and then transmit the same by using a single uplink CC.

In the following drawings, for the convenience of explanation, it is assumed that the number of downlink subframes and the number of uplink subframes that can be used for the backhaul link are equal in one DL CC and in one UL CC. BH n (n is a natural number) indicates a backhaul link HARQ process n, and n indicates a backhaul link HARQ process number. For example, BH1 indicates a backhaul link HARQ process 1.

HARQ process numbers may not be mapped to subframe indexes in a one-to-one manner according to a subframe allocation. Namely, when the number of downlink subframes is larger and the number of uplink subframes is smaller, because the downlink (DL):uplink (UL) ratio is different, the backhaul link HARQ process number may not have a fixed value at certain subframe intervals.

In particular, when the number of uplink subframes is smaller, the a backhaul uplink ACK/NACK with respect to backhaul downlink data transmitted in a downlink subframe can be transmitted in a first available uplink subframe. In this case, a plurality of downlink subframes may correspond to the uplink subframe, and a method for transmitting a plurality of backhaul uplink ACK/NACKs is required. As an example of this method, ACK/NACK bundling or ACK/NACK multiplexing/channel selection, and the like, may be employed.

RXs represented in the subframes of the DL-CC indicate that the RS receives a backhaul downlink signal from the BS, and TXs represented in the subframes of the DL-CC indicate that the RS transmits an access downlink signal to the RS UE. TXs represented in the subframes of the UL-CC indicate that the RS transmits a backhaul uplink signal to the BS, and RXs represented in the subframes of the UL-CC indicate that the RS receives an access uplink signal from the RS UE. 'A's represented within subframes indicate that corresponding radio resources are used only for the access link, rather than used for the backhaul link.

Some drawings designate the purpose of all the subframes as to whether they are used for either the backhaul link or the access link for the sake of explanation, but this does not mean that all the subframes are used. Namely, only some of the subframes may be allocated to be used for the backhaul link or the access link. This means that the number of allocated subframes may vary depending on the load of the backhaul link or the access link. Namely, only A1 and BH1 may be defined according to circumstances.

Subframe indexes may be sequentially allocated from 0 to 9 in a corresponding frame. In the following drawings, subframe indexes of consecutive frames are consecutively represented in the ascending order for the sake of explanation.

Figure 11:
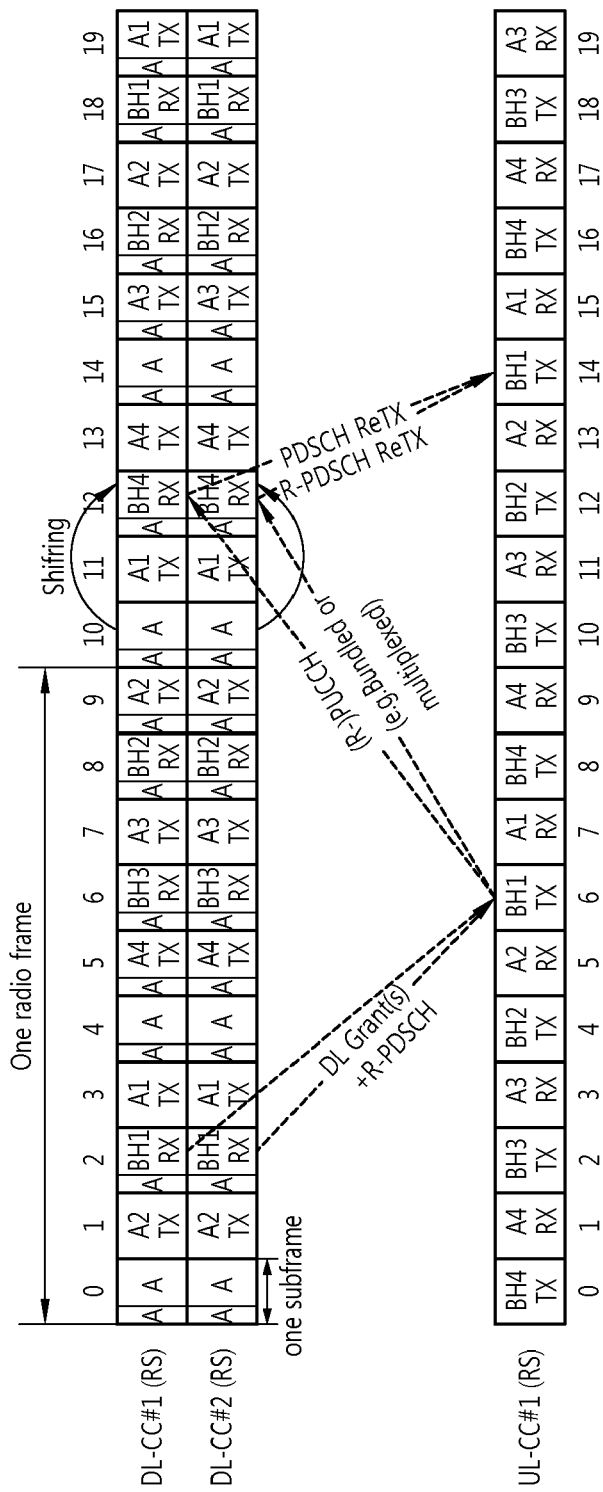
FIGS. 11 and 12 illustrate a method for performing HARQ by using the carrier operating method described in FIG. 10.
Figure 12:
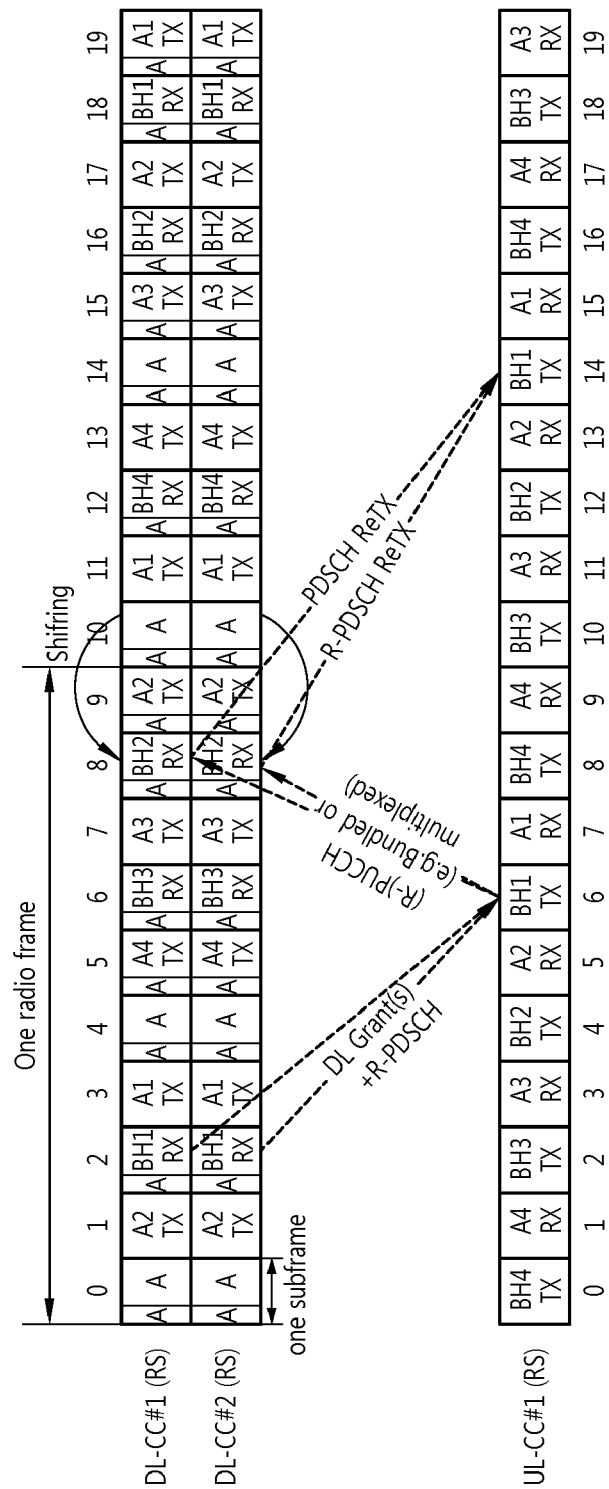

FIGS. 11 and 12 illustrate a method for performing HARQ by using the carrier operating method described in FIG. 10.

With reference to FIGS. 11 and 12, a backhaul link HARQ process (referred to as an 'HARQ process', hereinafter) is aligned in the DL-CC#1 and DL-CC#2. Namely, the same HARQ process is performed in the subframes of the respective downlink CCs having the same subframe index.

As shown in FIGS. 11 and 12, the RS receives a downlink grant and backhaul downlink data with respect to BH1 (HARQ process 1) in the subframe 2 of DL-CC#1 and the subframe 2 of DL-CC#2. The backhaul downlink data is transmitted via the R-PDSCH in the subframe 2 to the BS, and the R-PDSCH refers to a PDSCH used when the BS transmits data to the RS.

In this case, the RS bundles or multiplexes ACK/NACKs with respect to the backhaul downlink data received via the DL-CC#1 and DL-CC#2 in the subframe 6. Such ACK/NACKs may be transmitted through the R-PUCCH via which the RS transmits an uplink signal. The R-PUCCH may have a smaller number of available SC-FDMA symbols than the PUCCH via which the UE transmits an uplink signal to the BS.

Also, the R-PUCCH information may be transmitted always as the R-PUSCH. Namely, a backhaul uplink ACK/NACK with respect to the backhaul downlink transmission may be always transmitted as the R-PUSCH. There is a high possibility that the downlink subframe and the uplink subframe used for the backhaul link are subframes transmitting data. Thus, on the assumption that the R-PUSCH is always highly likely to exist in the uplink subframe in which the backhaul uplink ACK/NACK with respect to the backhaul downlink transmission is transmitted, the backhaul uplink ACK/ANCK can be always transmitted as the R-PUSCH. If there is no R-PUSCH, an R-PUSCH without data allocated thereto may be forcibly scheduled and the backhaul uplink ACK/NACK may be transmitted therein. Hereinafter, the ACK/NACK refers to a backhaul uplink ACK/NACK or a backhaul downlink ACK/NACK transmitted between the BS and the RS.

In case of using bundling, for example, when the backhaul downlink data transmitted in the DL-CC#1 and the backhaul downlink data transmitted in the DL-CC#2 are all successfully received, 1 may be transmitted, and in other cases, 0 may be transmitted. When 1 is received, the BS can be aware that the receiving of the backhaul downlink data transmitted in the two DL-CCs have been successful. When 0 is received, the BS cannot recognize in which of the DL-CCs the receiving of the backhaul downlink data which were transmitted has failed, so the BS may retransmit the backhaul downlink data in every DL-CCs.

In case of using the multiplexing scheme, ACK/NACKs with respect to the respective DL-CCs are transmitted by using different resources. Thus, the BS can be aware whether or not the RS has successfully received the backhaul downlink data transmitted in each DL-CC. Although the amount of radio resources used for the ACK/NACK transmission increases compared with that of the bundling scheme, the multiplexing scheme has an advantage in that whether or not the backhaul downlink data has been received can be known in each DL-CC. The BS can retransmit the backhaul downlink data only with respect to the DL-CC for which NACK has been received.

The RS may receive new backhaul downlink data or retransmitted backhaul downlink data according to the ACK/NACK. In this case, a subframe in which the new backhaul downlink data is received or a subframe in which the retransmitted backhaul downlink data may overlap with a subframe in which essential information is to be transmitted to the RS UE, generating a collision. When the collision occurs, the BS shifts a transmission point in time of the corresponding data so that the data can be transmitted in a next reception-available subframe (subframe 12) as shown in FIG. 11 or a previous reception-available subframe (subframe 8).

Figure 13:
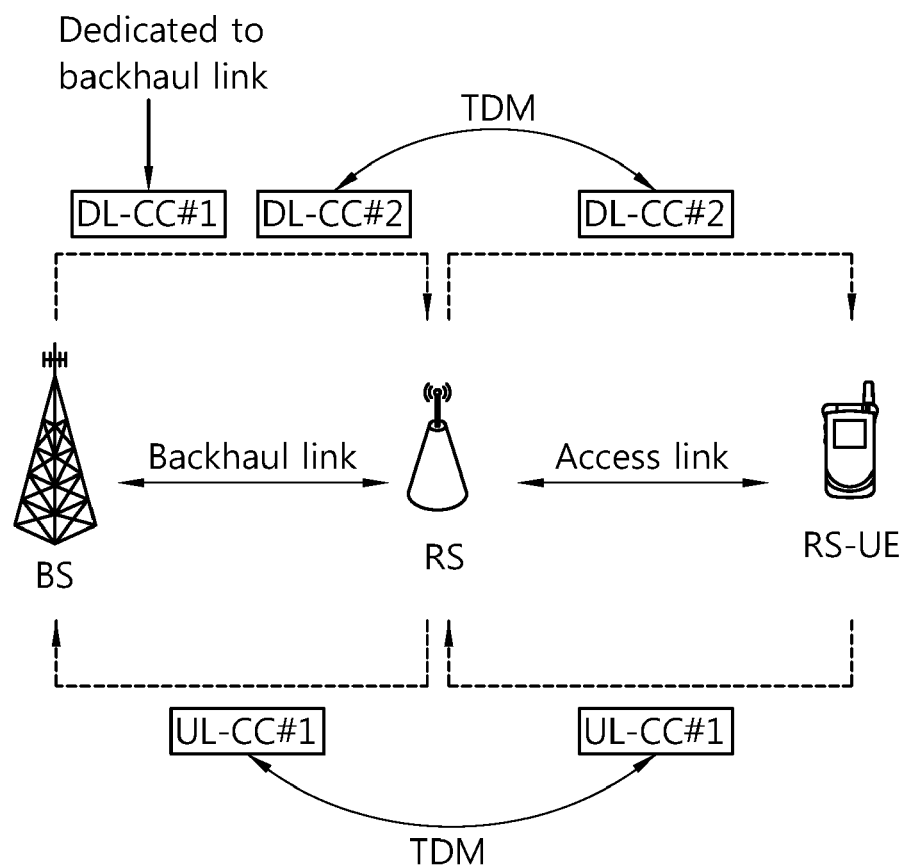
FIG. 13 illustrates a method for operating carriers in a backhaul link when a plurality of downlink component carriers and a single uplink component carrier are used according to a third exemplary embodiment of the present invention.

FIG. 13 illustrates a method for operating carriers in the backhaul link when a plurality of downlink component carriers and a single uplink component carrier are used according to a third exemplary embodiment of the present invention.

With reference to FIG. 13, when a plurality of downlink CCs can be used in the wireless communication system, at least one of the plurality of downlink CCs may be dedicated to be used for the backhaul downlink and the other remaining downlink CCs may be used for the backhaul downlink and the access downlink in the TDM manner. The uplink CCs may be used in the TDM manner in the backhaul uplink and the access uplink.

For example, when there are two downlink CCs (DL-CC#1, DL-CC#2) and one uplink CC (UL-CC#1), the DL-CC#1, DL-CC#2, and UL-CC#1 may have a different frequency band, respectively. In this case, the DL-CC#1 may be dedicated to be used in the backhaul downlink, and the DL-CC#2 may be used in the TDM manner in the backhaul downlink and the access downlink. When the carrier operating method is employed, the RS can receive backhaul downlink data in any subframe through the DL-CC#1. Meanwhile, there is a subframe in which the backhaul downlink data is not received through the DL-CC#2.

Thus, in order to solve the problem, when the RS performs HARQ in the backhaul link, the RS may divide subframes: a subframe that can be used for the backhaul link and a subframe that can be used for the access link with respect to the DL-CC#2 and UL-CC#1. For example, a subframe having an even number subframe index may be allocated to the backhaul link and a subframe having an odd number subframe index may be allocated to the access link. However, these are merely illustrative, and the subframes may be divided according to different methods. The RS may perform HARQ such that when a signal cannot be received from the BS in a subframe of the DL-CC#2, the signal is received from the BS through the DL-CC#1.

Figure 14:
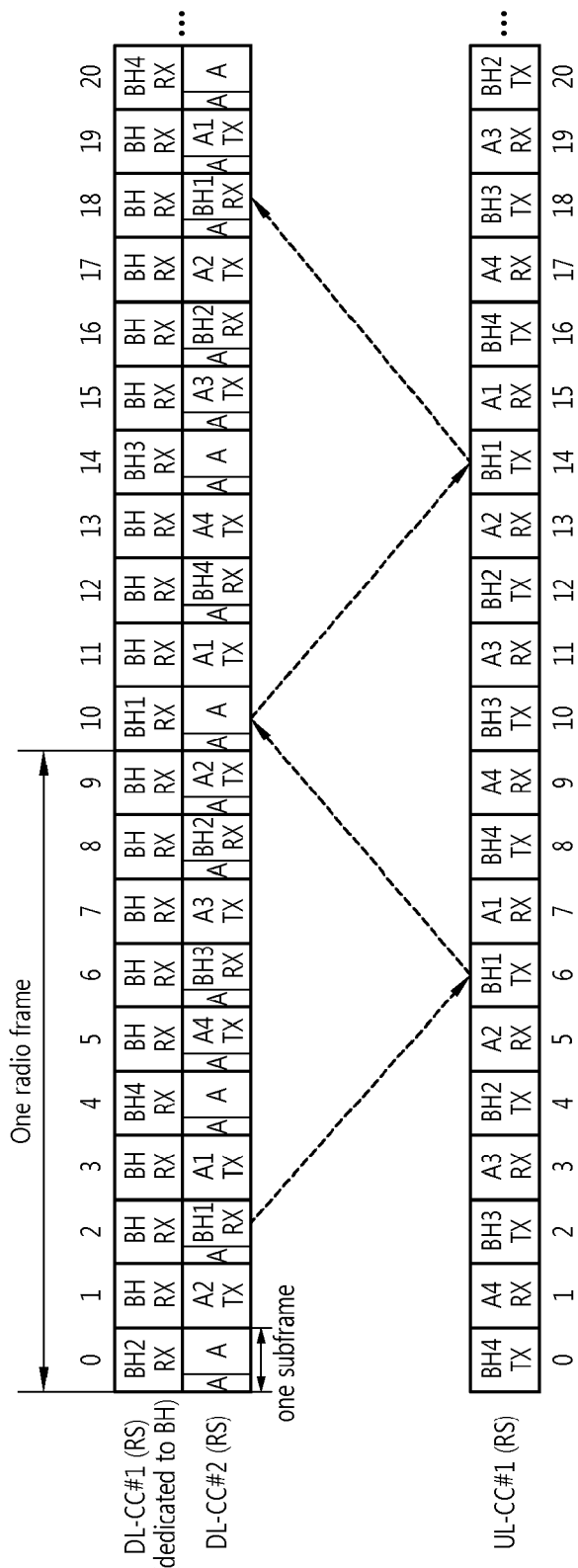
FIG. 14 illustrates the operations of respective carrier subframes when downlink component carriers operated in a TDM scheme are used as primary carriers according to the third exemplary embodiment of the present invention.

FIG. 14 illustrates the operations of respective carrier subframes when downlink component carriers operated in a TDM scheme are used as primary carriers according to the third exemplary embodiment of the present invention.

In FIG. 14, in the aspect that the DL-CC#2 can be used in the TDM manner both in the backhaul downlink and access downlink, it is discriminated from the DL-CC#1 dedicated to be used only for the backhaul downlink. In this case, the DL-CC#2 is used as a primary carrier in receiving data in the backhaul downlink, and the DL-CC#1 may be secondarily used when the backhaul downlink data cannot be received in the DL-CC#2. That is, the RS can receive signals from the BS in all the subframes of the DL-CC#1, yet the RS secondarily uses it.

Subframes constituting a radio frame may be divided into subframes having an odd number index and subframes having an even number index. In this case, the subframes having an odd number index (e.g., subframes 1, 3, 5, etc.) may be used for the access downlink, and the subframes having an even number index (e.g., subframes 0, 2, 4, etc.) may used for the backhaul downlink.

Hereinafter, it is assumed that an HARQ period in the backhaul link and the access link is eight subframes.

Figure 15:
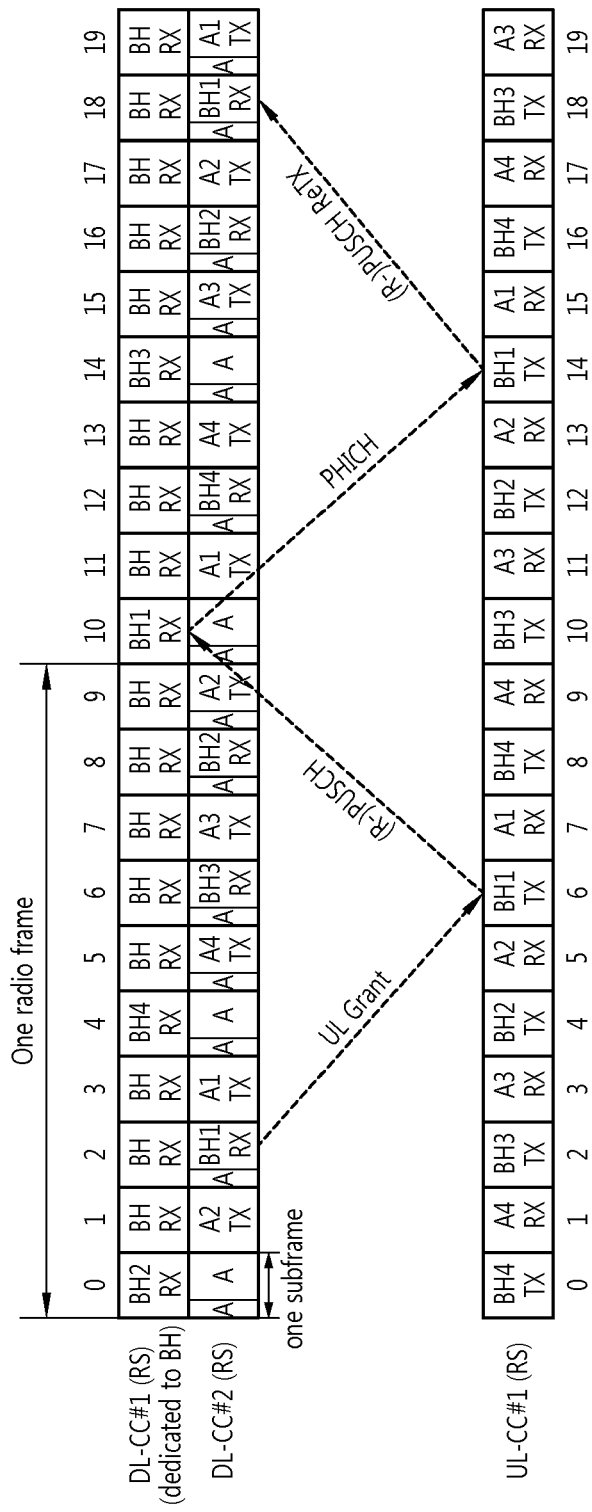
FIG. 15 illustrates a backhaul uplink HARQ performing method according to the third exemplary embodiment of the present invention.

FIG. 15 illustrates a backhaul uplink HARQ performing method according to the third exemplary embodiment of the present invention.

With reference to FIG. 15, the RS may receive an uplink grant with respect to the HARQ process 1 from the BS in the subframe 2 of the DL-CC#2. The RS transmits backhaul uplink data with respect to the HARQ process 1 in the subframe 6 of the UL-CC#1. The BS transmits an ACK/NACK with respect to the backhaul uplink data in the subframe 10 of the DL-CC#1, rather than in the subframe 10 of the DL-CC#2. The reason is because the RS must transmit essential information to the RS UE in the subframe 10 of the DL-CC#2, it cannot receive a backhaul downlink signal from the BS. The DL-CC#1 is a component carrier dedicated to be used for the backhaul downlink and has a different frequency band from that of the DL-CC#2, so the RS can receive an ACK/NACK transmitted by the BS in the subframe 10 of the DL-CC#1. The BS may transmit the ACK/NACK through the PHICH included in the subframe 10 of the DL-CC#1. The RS may retransmit backhaul uplink data with respect to the HARQ process 1 or may transmit new backhaul uplink data in the subframe 14 of the UL-CC#1. Likewise, an HARQ process 3 (BH3) is also performed.

In the drawings that follow FIG. 15, the PHICH may be a channel that it transmits the ACK/NACK and has the same meaning. For example, an uplink grant whose new data indicator (NDI) is not changed (toggled) can serve as the ACK/NACK of the PHICH.

Figure 16:
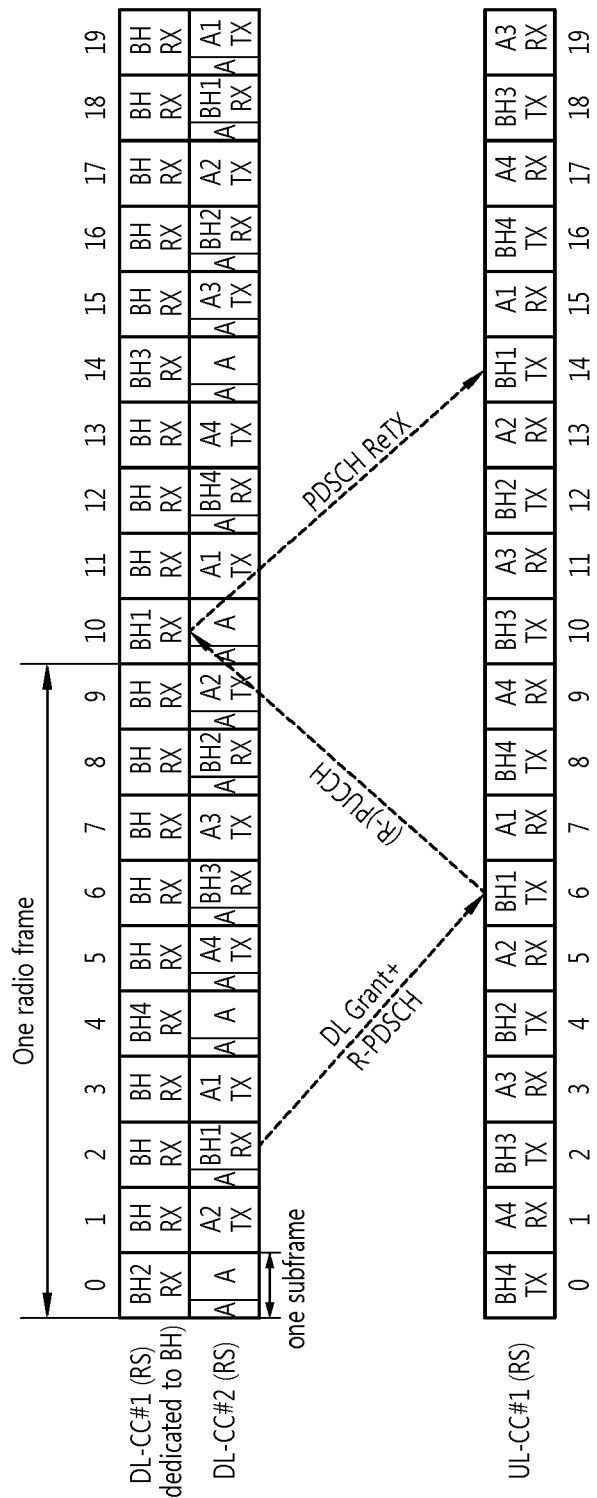
FIG. 16 illustrates a backhaul downlink HARQ performing method according to the third exemplary embodiment of the present invention.

FIG. 16 illustrates a backhaul downlink HARQ performing method according to the third exemplary embodiment of the present invention.

With reference to FIG. 16, the RS receives a downlink grand and backhaul downlink data through a radio resource indicated by the downlink grant in the subframe 2 of the DL-CC#2. The RS transmits an ACK/NACK with respect to the backhaul downlink data to the BS in the subframe 6 of the UL-CC#1. The BS transmits new backhaul downlink data or retransmits the backhaul downlink data in the subframe 10 of the DL-CC#1, rather than in the subframe 10 of the DL-CC#2, according to the ACK/NACK. In this case, the BS may use the same format at that of the PDSCH used in transmitting a signal to the UE in the DL-CC#1. This is because, unlike the DL-CC#2, the DL-CC#1 does not need a guard interval according to transmission and reception switching.

In the above example, the BS may transmit the backhaul downlink data by using both the DL-CC#1 and DL-CC#2. For example, the BS may simultaneously transmit the backhaul downlink data through the subframes 1 and 2 of the DL-CC#1 and the subframe 2 of the DL-CC#2. The RS may transmit the ACK/NACKs with respect to the backhaul downlink data received from the plurality of subframes (which belong to different downlink CCs) by using a single uplink CC through bundling or multiplexing. In this case, bundling may be performed in units of two subframes. This because the subframes allocated to the access link and the backhaul link are divided into subframes having odd number or even number subframe indexes.

It must be designed such that the backhaul downlink data transmitted in the subframe 2 of the DL-CC#2, as well as the backhaul downlink data transmitted in the subframe 1 and 2 of the DL-CC#1, is re-transmitted in the subframes 9 and 10 of the DL-CC#1.

Hereinafter, an HARQ performing method in the backhaul link when backhaul dedicated downlink carrier is used as a primary carrier and a downlink carrier used in the TDM manner in the backhaul downlink and the access downlink is used as a secondary carrier will now be described.

Figure 17:
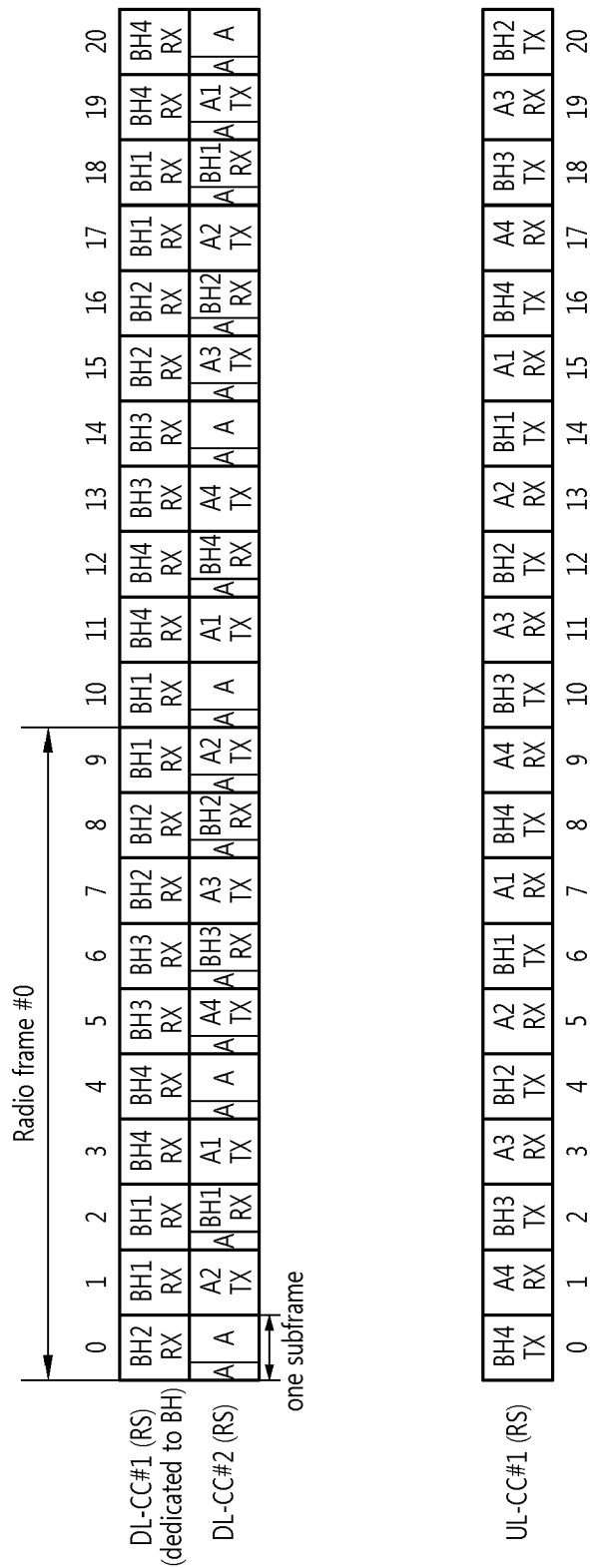
FIG. 17 illustrates the operations in respective carrier subframes when a DL-CC#1 is used as a primary carrier in the third exemplary embodiment according to a fourth exemplary embodiment of the present invention.

FIG. 17 illustrates the operations in respective carrier subframes when the DL-CC#1 is used as a primary carrier in the third exemplary embodiment according to a fourth exemplary embodiment of the present invention.

The BS may transmit a backhaul downlink signal in every subframe through the DL-CC#1. That is, the RS may receive the backhaul downlink signal in every subframe of the DL-CC#1. FIG. 17 illustrates a case in which four HARQ processes are performed in a single radio frame of the DL-CC#1. For example, HARQ process 1 may be performed in the subframes 1, 9, and 17 or subframes 2, 10, and 18 of the DL-CC#1, and HARQ process 2 may be performed in subframes 3, 11, and 19, or subframes 4, 12, and 20. Likewise, HARQ processes 3 and 4 can be also performed at periods of eight subframes.

Also, the RS may secondarily or additionally receive the backhaul downlink signal in subframes having an even number subframe index in the DL-CC#2, rather than subframes having subframe indexes 0, 4, 5, and 9. The backhaul downlink signal received in a subframe of the DL-CC#2 may be related to an HARQ process performed in a subframe of the DL-CC#1 having the same subframe index. That is, a backhaul downlink signal received in the subframe 2 of the DL-CC#2 is related to an HARQ process performed in the subframe 2 of the DL-CC#1.

The RS may receive the backhaul downlink signal by using the same PDCCH and PDSCH formats as those of the UE through the DL-CC#1 and receive the backhaul downlink signal by using R-PDCCH and R-PDSCH which are different from PDCCH and PDSCH of the UE through the DL-CC#2.

Figure 18:
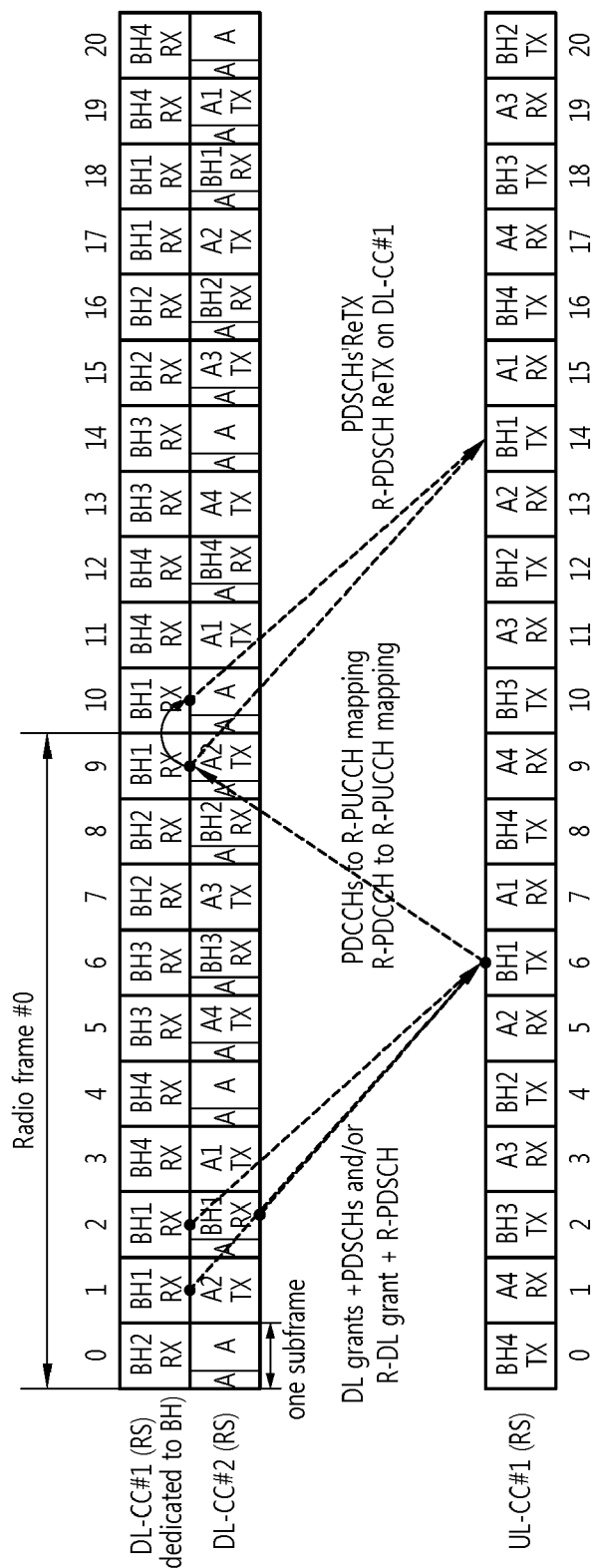
FIG. 18 illustrates a backhaul downlink HARQ performing method according to the fourth exemplary embodiment of the present invention.

FIG. 18 illustrates a backhaul downlink HARQ performing method according to the fourth exemplary embodiment of the present invention.

With reference to FIG. 18, the RS may receive a downlink grant and backhaul downlink data through a radio resource indicated by the downlink grant in the subframes 1 and 2 of the DL-CC#1. Also, the RS may receive backhaul downlink data in the subframe 2 of the DL-CC#2. In this case, the RS may receive the backhaul downlink data through the same format of PDSCH as that of the UE in the DL-CC#1 and the backhaul downlink data through the R-PDSCH used for the RS in the DL-CC#2.

The RS transmits an ACK/NACK with respect to the backhaul downlink data in the subframe 6 of the UL-CC#1. In this case, the ACK/NACK may be transmitted through the R-PUCCH. A radio resource by which the ACK/NACK is transmitted on the R-PUCCH may be determined according to a radio resource of the PDCCH received in the DL-CC#1. For example, an ACK/NACK allocation radio resource transmitted on the R-PUCCH may be determined based on a CCE index of the PDCCH. Also, a radio resource by which the ACK/NACK is transmitted on the R-PUCCH may be determined according to a radio resource of the R-PDCCH transmitted in the DL-CC#2.

The BS may retransmit the backhaul downlink data of the subframe 1 of the DL-CC#1 or new backhaul downlink data in the subframe 9 of the DL-CC#1. Also, the BS may retransmit the backhaul downlink data of the subframe 2 of the DL-CC#1 or new backhaul downlink data in the subframe 10 of the DL-CC#1. The BS may retransmit the backhaul downlink data, which has been transmitted in the subframe 2 of the DL-CC#2, in the subframes 9 and 10 of the DL-CC#1.

Figure 19:
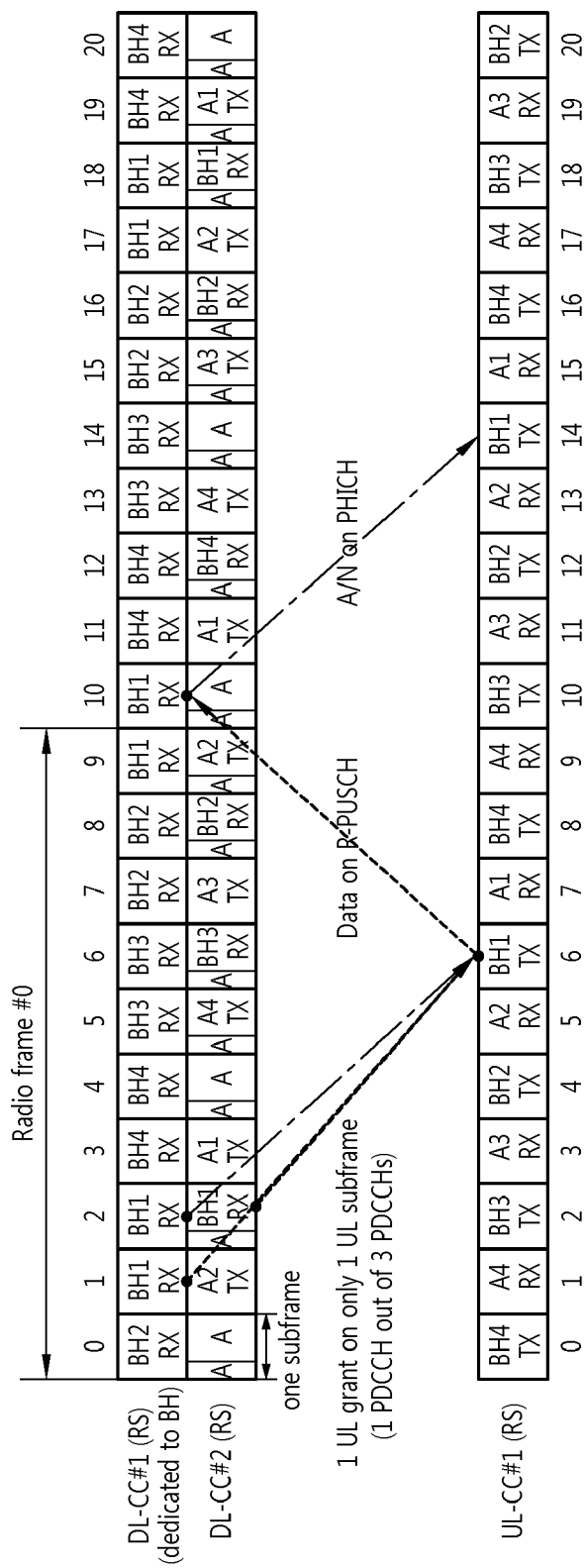
FIG. 19 illustrates a backhaul uplink HARQ performing method according to the fourth exemplary embodiment of the present invention.

FIG. 19 illustrates a backhaul uplink HARQ performing method according to the fourth exemplary embodiment of the present invention.

With reference to FIG. 19, the RS may receive the same uplink grant from a plurality of subframes participating in the same HARQ process. For example, the RS may receive the same uplink grant from the subframes 1 and 2 of the DL-CC#1 and the subframe 2 of the DL-CC#2 participating in the HARQ process 1 (BH 1).

In this case, the uplink grant may indicate a subframe (n+5) or (n+4) of UL-CC#1 with respect to a subframe n of DL-CC#1. In the foregoing example, a radio resource of the subframe 6 of the UL-CC#1 may be determined from the uplink grant. That is, the RS transmits backhaul uplink data to the BS through the R-PUSCH of the subframe 6 of the UL-CC#1.

Or, the RS may receive an uplink grant from only one subframe included in a downlink carrier dedicated to be used for the backhaul link among a plurality of subframes participating in the same HARQ process.

The BS may transmit an ACK/NACK through the PHICH of the subframe 10 of the DL-CC#1. In this case, if the BS transmits the ACK/NACK in the subframe 10 of the DL-CC#2, the RS cannot receive it. Thus, BS does not transmit the ACK/NACK in the subframe 10 of the DL-CC#2.

Figure 20:
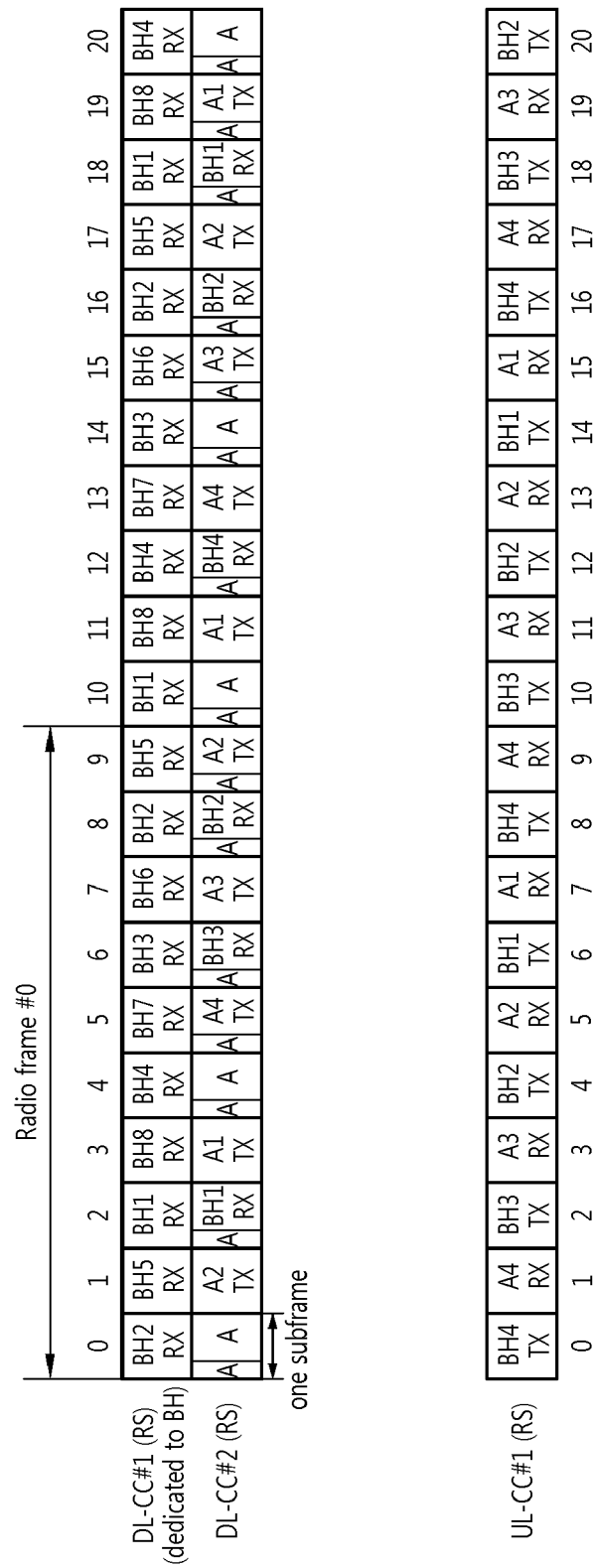
FIG. 20 illustrates the operations in respective carrier subframes when a DL-CC#1 is used as a primary carrier in the third exemplary embodiment according to a fifth exemplary embodiment of the present invention.

FIG. 20 illustrates the operations in respective carrier subframes when the DL-CC#1 is used as a primary carrier in the third exemplary embodiment according to a fifth exemplary embodiment of the present invention.

Compared with the fourth exemplary embodiment of FIG. 17, eight HARQ processes are performed in the DL-CC#1 in the fifth exemplary embodiment of the present invention. For example, HARQ process 1 is performed in subframes 2, 10, and 18 of the DL-CC#1, and HARQ process 2 is performed in subframes 0, 8, and 16. Also, the RS may secondarily or additionally receive a backhaul downlink signal in subframes having an even number subframe index, rather than in subframes having subframe indexes 0, 4, 5, and 9, of the DL-CC#2. The backhaul downlink signal received in the subframes of the DL-CC#2 may be related to an HARQ process performed in the subframes of the DL-CC#1 having the same subframe indexes.

The RS may receive the backhaul downlink signal by using the same PDCCH and PDSCH formats as those of the UE through the DL-CC#1 and a backhaul downlink signal by using the R-PDCCH and R-PDSCH formats different from PDCCH and PDSCH of the UE through the DL-CC#2.

Figure 21:
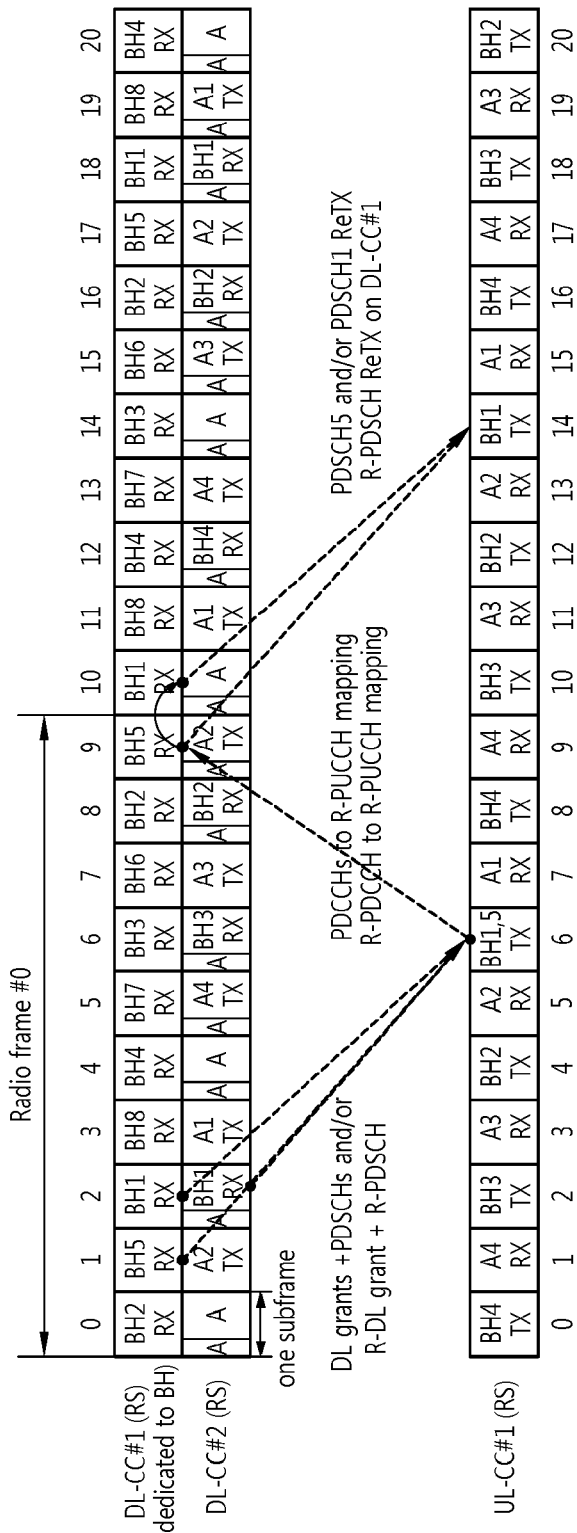
FIG. 21 illustrates a backhaul downlink HARQ performing method according to a fifth exemplary embodiment of the present invention.

FIG. 21 illustrates a backhaul downlink HARQ performing method according to a fifth exemplary embodiment of the present invention.

With reference to FIG. 21, the RS may receive downlink grants and backhaul downlink data through radio resources indicated by the downlink grants in the subframes 1 and 2 of the DL-CC#1. In this case, unlike the case illustrated in FIG. 18, the backhaul downlink data transmitted in the subframe 1 and the backhaul downlink data transmitted in the subframe 2 may be data regarding different HARQ processes.

Also, the RS may receive backhaul downlink data in the subframe 2 of the DL-CC#2. The RS may receive the backhaul downlink data via the same format of PDSCH as that of the UE, and receive backhaul downlink data via the R-PDSCH used for the RS in the DL-CC#2.

The RS transmits an ACK/NACK with respect to the backhaul downlink data in the subframe 6 of the UL-CC#1. In this case, the ACK/NACK may be transmitted via the R-PUCCH. A radio resource by which the ACK/NACK is transmitted on the R-PUCCH may be determined according to a radio resource of the PDCCH received in the DL-CC#1. For example, an ACK/NACK allocation radio resource transmitted on the R-PUCCH may be determined based on a CCE index of the PDCCH. Also, a radio resource by which the ACK/NACK is transmitted on the R-PUCCH may be determined according to a radio resource of the R-PDCCH transmitted in the DL-CC#2.

The BS may retransmit the backhaul downlink data of the subframe 1 of the DL-CC#1 or new backhaul downlink data in the subframe 9 of the DL-CC#1. Also, the BS may retransmit the backhaul downlink data of the subframe 2 of the DL-CC#1 or new backhaul downlink data in the subframe 10 of the DL-CC#1. The BS may retransmit the backhaul downlink data, which has been transmitted in the subframe 2 of the DL-CC#2, in the subframes 9 and 10 of the DL-CC#1.

Figure 22:
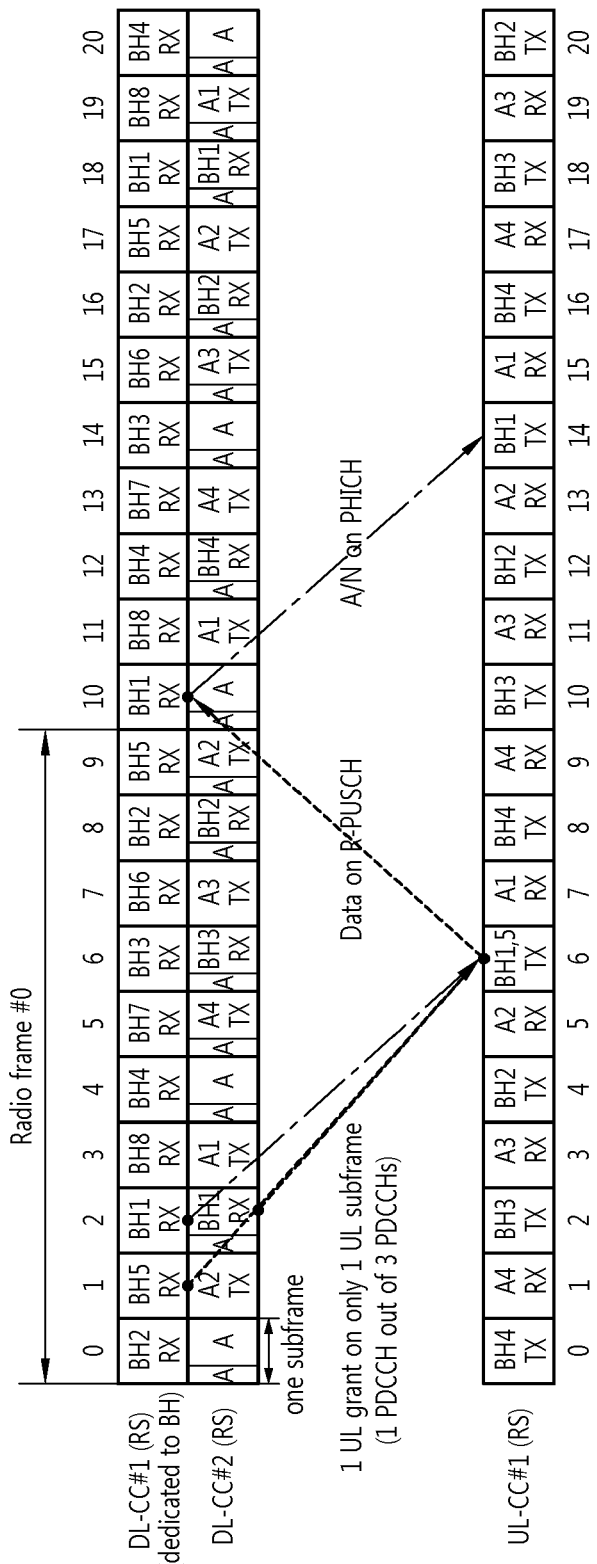
FIG. 22 illustrates a backhaul uplink HARQ performing method according to the fifth exemplary embodiment of the present invention.

FIG. 22 illustrates a backhaul uplink HARQ performing method according to the fifth exemplary embodiment of the present invention.

The case illustrated in FIG. 22 is different from the case illustrated in FIG. 19 in that eight HARQ processes are performed in the DL-CC#1. That is, the number of HARQ processes performed in the DL-CC dedicated to be used in the backhaul link can vary.

Figure 23:
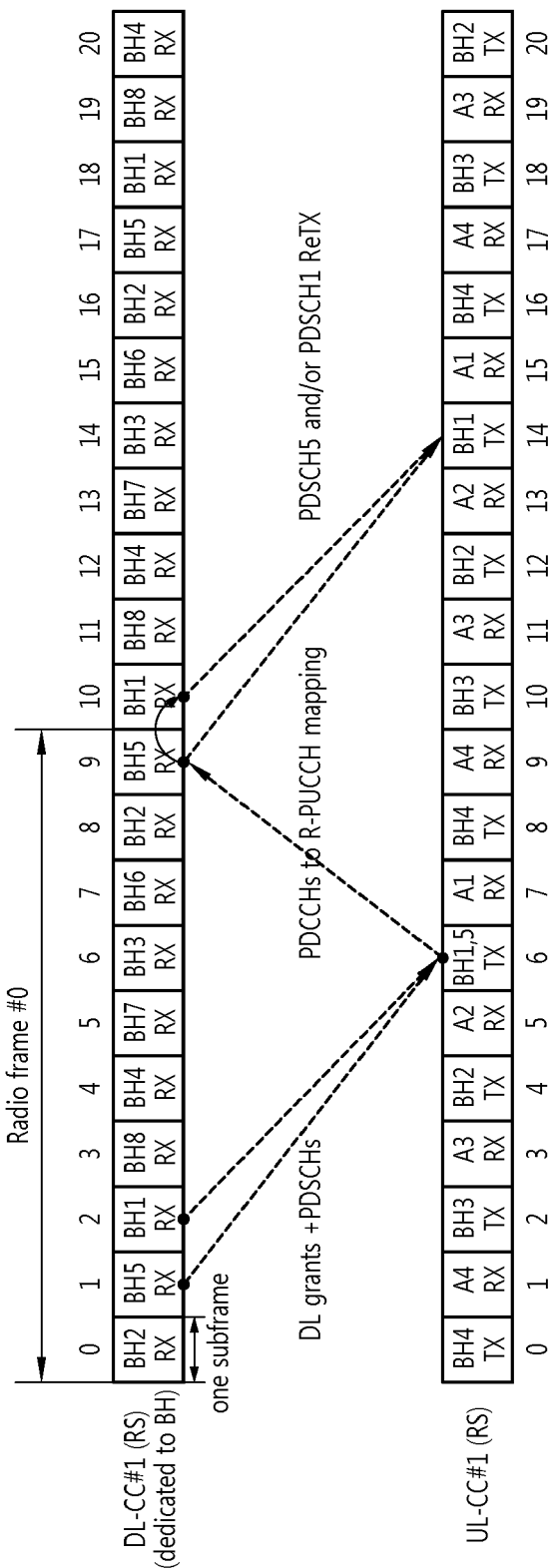
FIG. 23 illustrates a backhaul downlink HARQ performing method when a single backhaul dedicated component carrier is used for a backhaul downlink and an uplink carrier of a TDM scheme is used for a backhaul uplink and an access uplink.

FIG. 23 illustrates a backhaul downlink HARQ performing method when a single backhaul dedicated component carrier is used for the backhaul downlink and an uplink carrier of a TDM scheme is used for the backhaul uplink and the access uplink.

With reference to FIG. 23, when the subframe index of the DL-CC#1, in which the backhaul downlink data has been received, is n, the RS may transmit an ACK/NACK in a subframe (n+4) or (n+5) of the UL-CC#1. The RS may bundle or multiplex ACK/NACKs with respect to backhaul downlink data received in a plurality of subframes of the DL-CC#1 and transmit the same through the UL-CC#1.

For example, the RS receives backhaul downlink data with respect to the HARQ process 5 in the subframe 1 of the DL-CC#1 dedicated to be used for the backhaul link, and receives backhaul downlink data with respect to the HARQ process 1 in the subframe 2 of the DL-CC#1. In this case, ACK/NACKs with respect to the subframes 1 and 2 of the DL-CC#1 are transmitted in the subframe 6 of the UL-CC#1. That is, the ACK/NACKs are bundled or multiplexed in one subframe having an even number subframe index used for the backhaul link and then transmitted.

Figure 24:
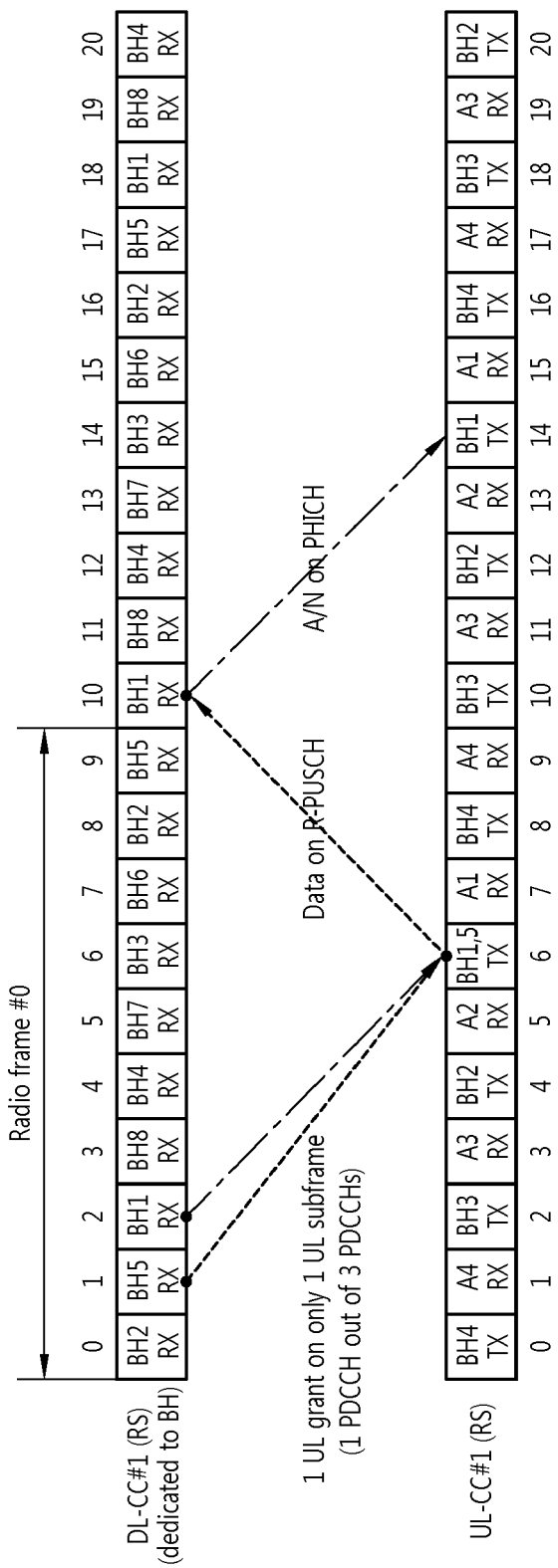
FIG. 24 illustrates a backhaul uplink HARQ performing method when a single backhaul dedicated component carrier is used for a backhaul downlink and an uplink carrier of a TDM scheme is used for a backhaul uplink and an access uplink.

FIG. 24 illustrates a backhaul uplink HARQ performing method when a single backhaul dedicated component carrier is used for the backhaul downlink and an uplink carrier of the TDM scheme is used for the backhaul uplink and the access uplink.

With reference to FIG. 24, when an uplink grant is received in the subframe n of the DL-CC#1, the RS may transmit backhaul uplink data in the subframe (n+4) or (n+5) of the UL-CC#1. That is, the RS may receive an uplink grant indicating the same subframe of the UL-CC#1 in the plurality of subframes of the DL-CC#1. The RS transmits backhaul uplink data in a subframe of the UL-CC#1 indicated by the received uplink grant. And then, the RS may receive an ACK/NACK from the DL-CC#1 after four subframes from the subframe in which the backhaul uplink data has been transmitted.

For example, the RS receives an uplink grant with respect to the HARQ process 5 in the subframe 1 of the DL-CC#1 dedicated to be used for the backhaul link, and receive an uplink grant with respect to the HARQ process 1 in the subframe 2. In this case, the uplink grant may indicate the same subframe 6 of the UL-CC#1. The RS may transmit backhaul uplink data with respect to the HARQ processes 1 and 5 in the subframe 6 of the UL-CC#1. Also, the RS may receive an ACK/NACK with respect to the backhaul uplink data in the PHICH of the subframe 10 of the DL-CC#1.

A method of using a component carrier of the backhaul link and the access link in the multi-carrier system according to an exemplary embodiment of the present invention will now be described.

Figure 25:
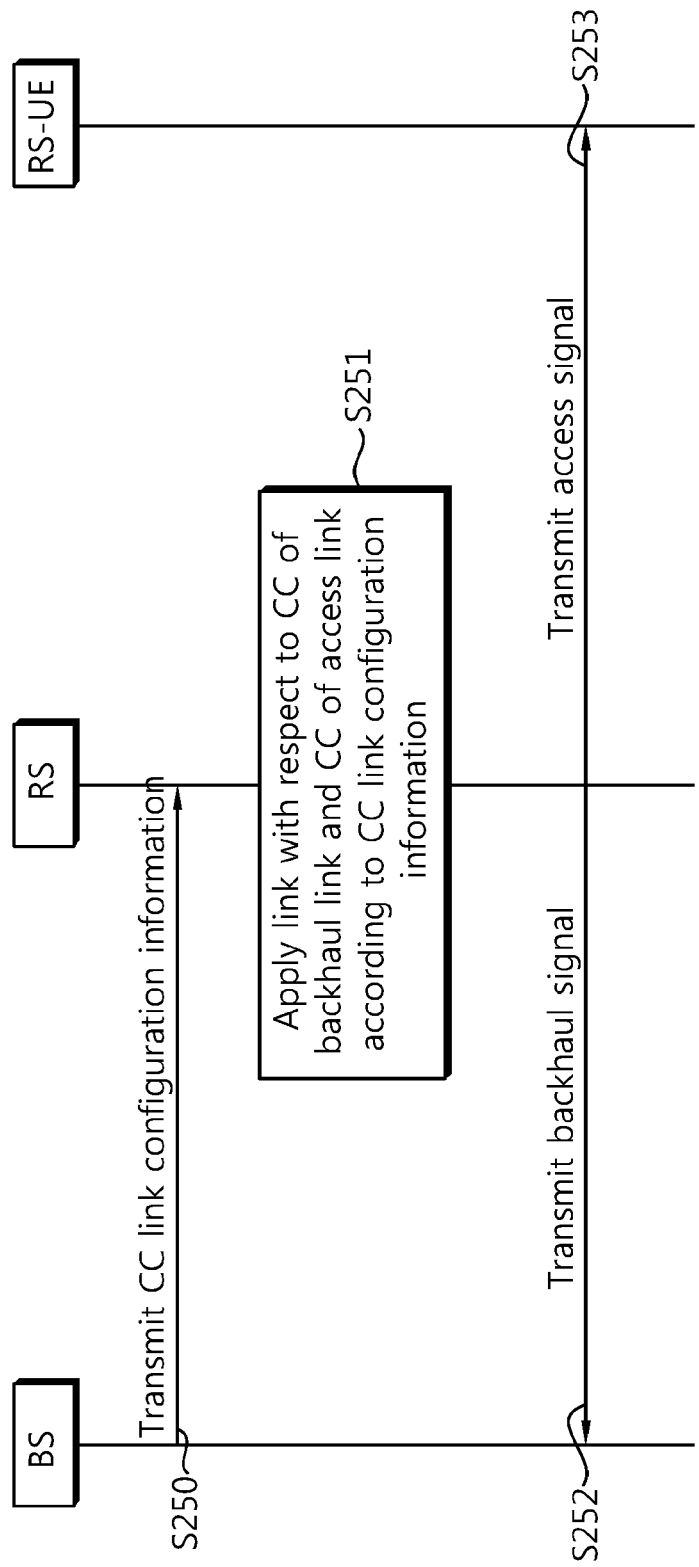
FIG. 25 illustrates a signaling process between a base station and a relay station.

FIG. 25 illustrates a signaling process between the base station and the relay station.

The BS transmits CC link configuration information to the RS (S250). Here, the CC link configuration information indicates which of the backhaul link and the access link a particular CC is used for.

For example, it is assumed that the DL-CC#2 is used for the backhaul downlink and the DL-CC#1 and the DL-CC#2 are used for the access downlink. In this case, the DL-CC#2 are used for both the backhaul downlink and the access downlink, the RS must use the DL-CC#2 in the TDM scheme. That is, the RS must receive a backhaul downlink signal and transmit an access downlink signal by using different time resources (i.e., different subframes or OFDM symbols) with respect to the DL-CC#2. Also, the RS must use a certain number of first OFDM symbols (e.g., first two OFDM symbols) in a subframe, in which the backhaul downlink signal is to be received, to transmit an access downlink signal with respect to the RS UE, and receive a backhaul downlink signal by using the other remaining OFDM symbols. However, when such a TDM scheme is applied, time resources that can be used for the backhaul downlink are reduced. If the amount of information to be transmitted in the backhaul downlink is increased or TDM operation is inadequate because the timing alignment of backhaul link is inaccurate by the RS's moving, or simultaneous services for backhaul link and access link are difficult in a state of the RS's handover, it would be preferred to set a CC dedicated to be used for the backhaul downlink. Then, the BS may allow the RS to use the DL-CC#2 only for the backhaul downlink, not for the access downlink, through CC link configuration information. That is, the BS may limit the use of the DL-CC#2 only to the backhaul downlink and prevents the RS from using the DL-CC#2 for the access downlink. Utilization examples of the CC link configuration information will be described later.

The BS may transmit the CC link configuration information as a physical layer signal via, e.g., the R-PDCCH of the DL-CC#2. Or, the BS may transmit the CC link configuration information as an higher-layer signal such as an RRC, a master information block (MIB), or a system information block (SIB), and in this case, the BS may transmit the CC link configuration information via the data channel such as R-PDSCH or PDSCH of the DL-CC#2. Hereinafter, R-PDSCH means a data channel which is decoded by the R-PDCCH.

The BS may transmit the R-PDCCH when the RS can't receive the PDCCH, and the RS decode the backhaul link data received via the data channel (e.g R-PDSCH or PDSCH) using the information in the R-PDCCH.

The RS applies a link for transmitting and receiving a signal to the CC of the backhaul link and the CC of the access link according to the CC link configuration information (S251). The BS-RS transmit a backhaul signal according to the CC link configuration information (S252), and the RS-RS UE transmits an access signal (S253).

Hereinafter, how the RS uses the CC in the backhaul link and the access link according to the CC link configuration information will now be described.

Figure 26:
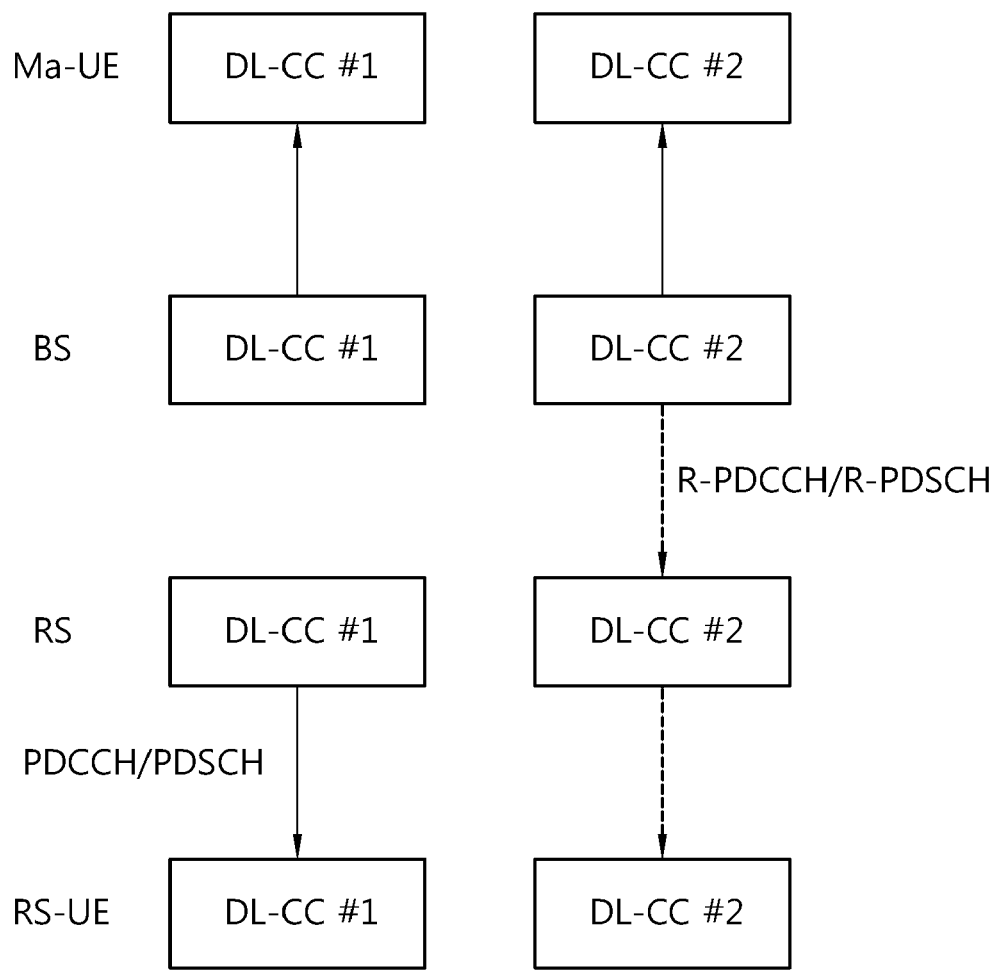
FIGS. 26 and 27 illustrate an example of a method of using component carriers of a backhaul link and an access link.
Figure 27:
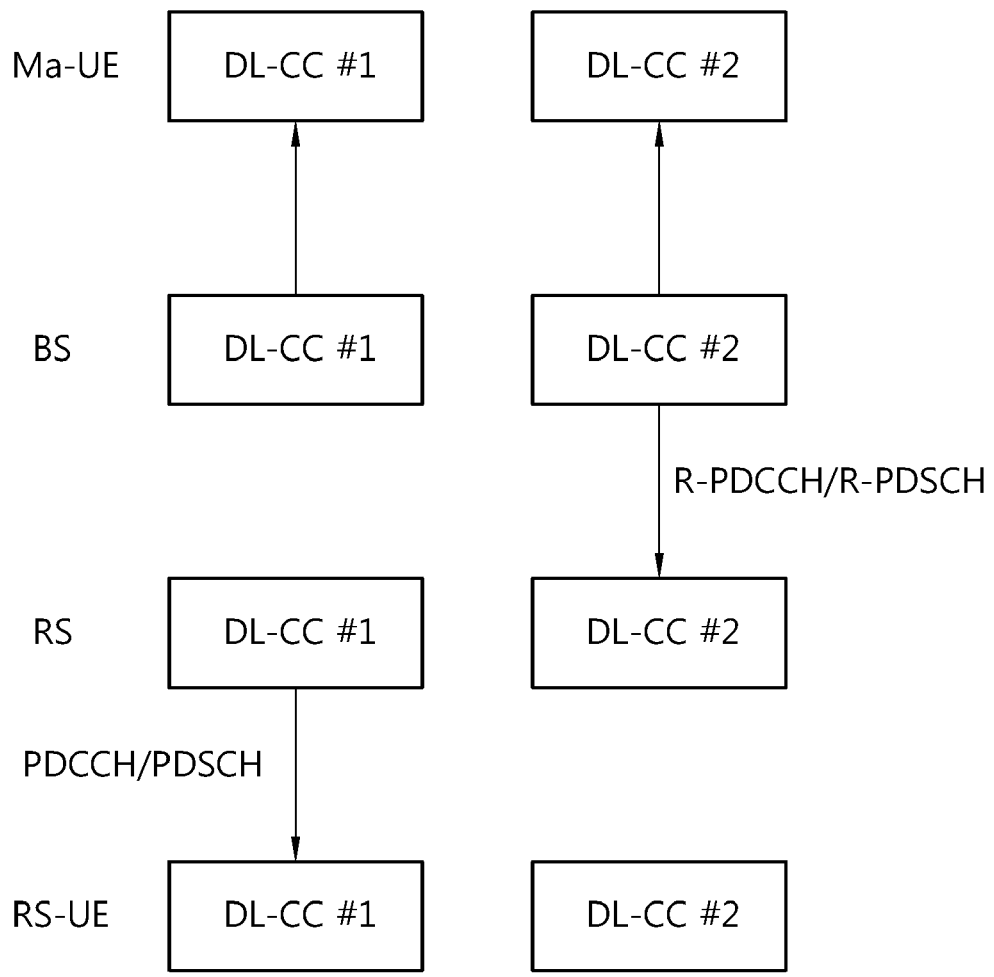

FIGS. 26 and 27 illustrate an example of a method of using component carriers of the backhaul link and the access link.

With reference to FIG. 26, the BS transmits a downlink signal to the macro UE (Ma-UE) by using the DL-CC#1 and DL-CC#2. Also, the BS may transmit a backhaul downlink signal to the RS by using the DL-CC#2. The RS may receive a backhaul downlink signal through the DL-CC#2 and transmit an access downlink signal to the RS UE through the DL-CC#1 and DL-CC#2. In this case, at the RS's side, the DL-CC#1 is a component carrier dedicated to the access downlink, and DL-CC#2 is a common component carrier used for both the backhaul downlink and the access downlink.

Thus, in case of the DL-CC#1, the RS can transmit a control channel and a data channel to the RS UE in the access downlink in the same form as the control channel (PDCCH) and the data channel (PDSCH) transmitted by the BS to the macro UE. Also, the RS uses the DL-CC#2 in the TDM manner. Thus, the control channel and the data channel transmitted by the BS to the RS in the DL-CC#2 may have different structures from those of the control channel (PDCCH) and the data channel (PDSCH) transmitted to the macro UE. That is, the control channel transmitted to the RS in the DL-CC#2 may have the form of R-PDCCH and the data channel may have the form of R-PDSCH.

In a situation that the CCs are used as illustrated in FIG. 26, the BS may dedicatedly use the DL-CC#2 for the backhaul link for the reasons of allocating more radio resources to the backhaul downlink or facilitating multiplexing a backhaul downlink signal and a downlink signal transmitted to the macro UE, and the like.

In this case, the BS may exclude an access downlink application of the DL-CC#2 by transmitting CC link configuration information via the R-PDCCH (in case of a physical layer signal) or the R-PDSCH (in case of an higher-layer signal) of the DL-CC#2. That is, as shown in FIG. 27, the DL-CC#2 may be dedicated to be used for the backhaul downlink and the DL-CC#1 may be dedicated to be used for the access downlink. In this case, the BS may configure the DL-CC#2 in the form of PDCCH or PDSCH, rather than R-PDCCH or R-PDSCH, and transmit the same to the RS. Because the DL-CC#2 is a component carrier dedicatedly used for the backhaul downlink, there is no need to operate the DL-CC#2 in the TDM manner. Thus, because available resources of the DL-CC#2 are increased the backhaul downlink transmission capacity is increased, and multiplexing with the signal transmitted to the macro UE can be also facilitated.

Figure 28:
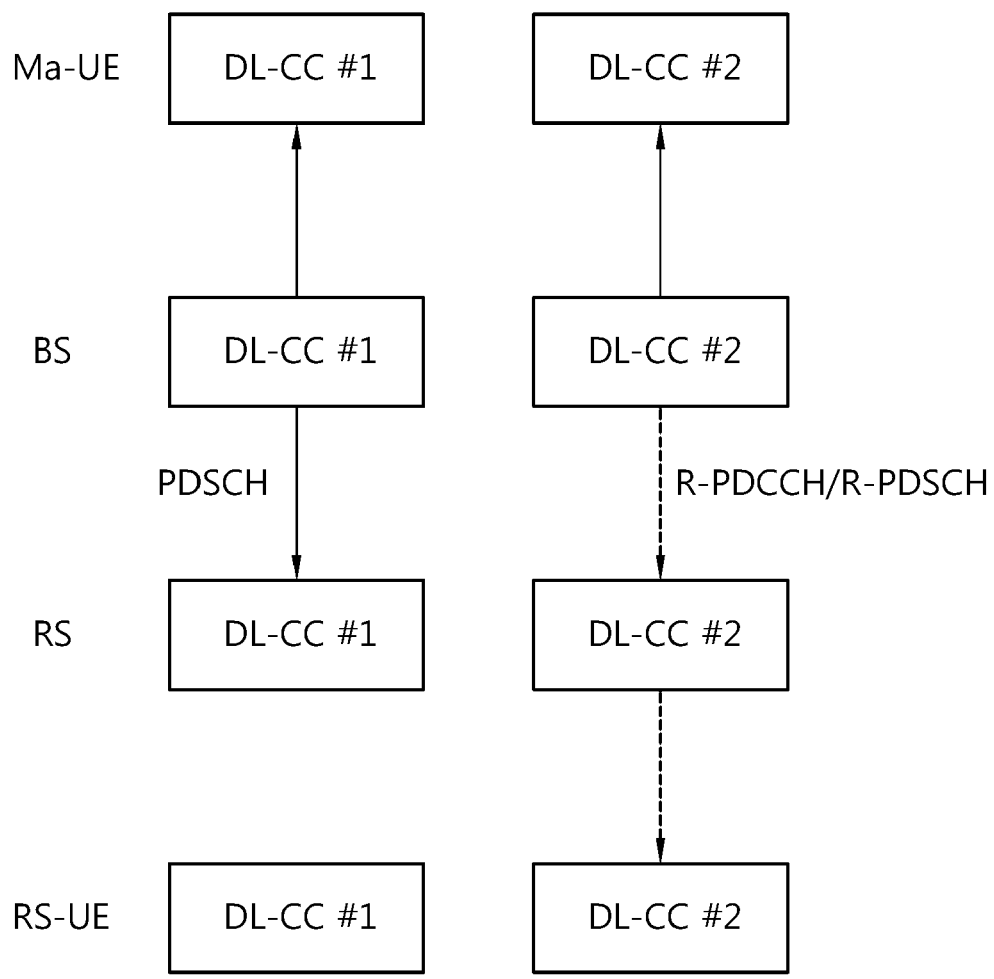
FIGS. 28 and 29 illustrate another example of a method of using component carriers of a backhaul link and an access link.
Figure 29:
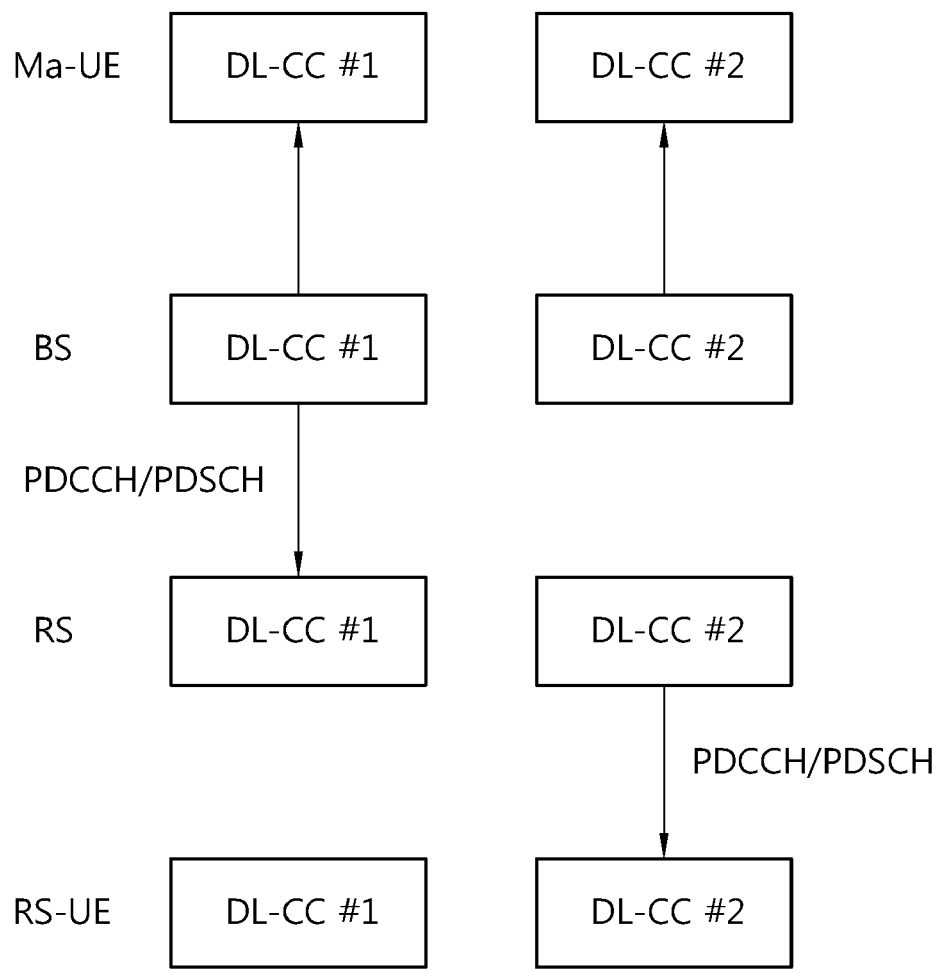

FIGS. 28 and 29 illustrate another example of a method of using component carriers of the backhaul link and the access link.

With reference to FIG. 28, the BS may transmit a downlink signal to the macro UE by using the DL-CC#1 and DL-CC#2. Also, the BS may transmit a backhaul downlink signal to the RS by using the DL-CC#1 and DL-CC#2. The RS may receive the backhaul downlink signal through the DL-CC#1 and DL-CC#2, and transmit an access downlink signal to the RS UE through the DL-CC#2. Namely, two CCs may be used for the backhaul downlink and one CC may be used for the access downlink.

In this case, at the RS's side, the DL-CC#1 is a component carrier dedicated to the backhaul downlink, and the DL-CC#2 is a common component carrier used for both the backhaul downlink and the access downlink. Thus, the RS uses the DL-CC#2 in the TDM manner, and the control channel and the data channel transmitted by the BS to the RS in the DL-CC#2 may have different structures from those of the control channel and the data channel transmitted to the macro UE. That is, the control channel transmitted to the RS in the DL-CC#2 may have the form of R-PDCCH and the data channel may have the form of R-PDSCH.

When control information is transmitted to the backhaul downlink between the BS and the RS by using only one CC, the BS may perform scheduling on other CCs of the backhaul downlink by using the CC transmitting the control information.

For example, in FIG. 28, the BS may transmit control information via the R-PDCCH of the DL-CC#2 and transmit only the data channel in the DL-CC#1. Because the DL-CC#1 is dedicatedly used for the backhaul downlink, the BS can transmit the data channel in the form of PDSCH. In this case, the BS can transmit also scheduling information regarding the PDSCH of the DL-CC#1 as well as the scheduling information regarding the R-PDSCH of the DL-CC#2 via the R-PDCCH of the DL-CC#2.

In the situation in which the CCs are used as illustrated in FIG. 28, the BS may need to change the application links of the CCs for various reasons. For example, the BS may need to change the CCs because a channel state of the CCs used for the access downlink or the backhaul downlink is not good. In this case, the BS may change application links of the CCs through CC link configuration information.

For example, the link application of the CCs may be changed as illustrated in FIG. 27. Or, the link application of the CCs may be changed as illustrated in FIG. 29. The link applications illustrated in FIG. 29 are different from those illustrated in FIG. 27 in that the application link of the DL-CC#1 is configured as the backhaul downlink, not the access downlink, and the application link of the DL-CC#2 is configured as the access downlink, not the backhaul downlink. Which of the configuration is to be applied may depend on channel states.

Figure 30:
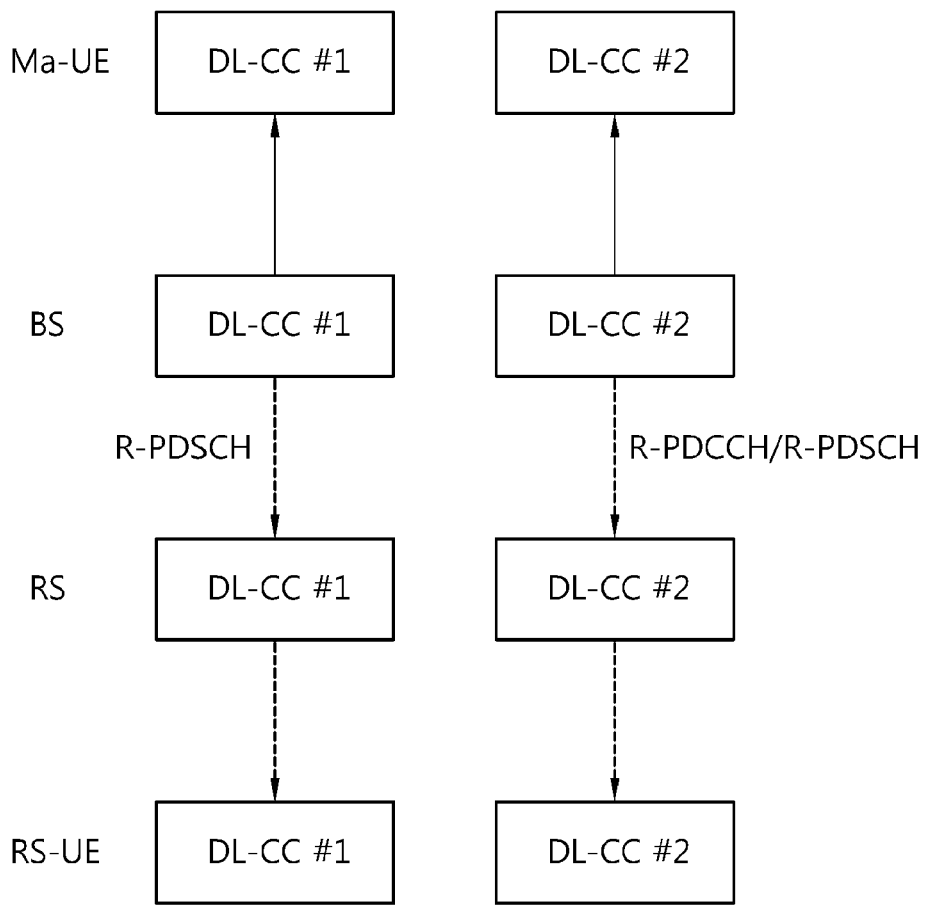
FIG. 30 illustrates still another example of a method of using component carriers of a backhaul link and an access link.

FIG. 30 illustrates still another example of a method of using component carriers of the backhaul link and the access link.

In FIG. 30, it is illustrated that the DL-CC#1 and DL-CC#2 are used for the backhaul downlink and the DL-CC#1 and DL-CC#2 are also used for the access downlink. Namely, all the CCs used for the backhaul downlink are used in the TDM manner. Also, in this case, the BS may transmit scheduling information regarding the data channels of the DL-CC#1 and DL-CC#2 via the R-PDCCH of one CC, e.g., the DL-CC#2. In the situation in which the CCs are used as illustrated in FIG. 30, the BS may need to change the application links of the CCs for various reasons. The BS may change the application links of the CCs as illustrated in FIG. 27 or 29.

FIGS. 25 to 30 show the cases in which the applications links of the CCs are changed for the backhaul downlink and the access downlink, but the present invention is not limited thereto. Namely, the application links of the CCs may be channel for the backhaul uplink and the access uplink. Also, the change of the application links of the CCs, e.g. from the case of FIG. 25 to the case of FIG. 26, has been described, but, conversely, the change of the application links of the CCs from the case of FIG. 26 to the case of FIG. 25 may be also possible.

Figure 31:
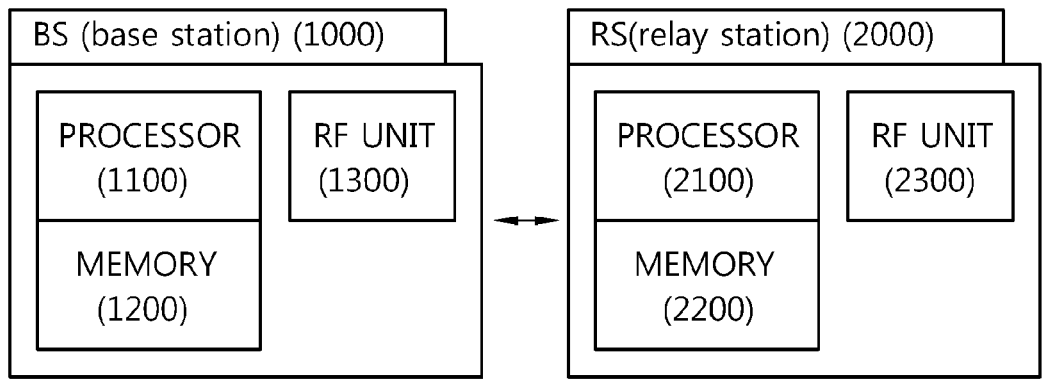
FIG. 31 shows schematic block diagrams of a base station and a relay station.

FIG. 31 shows schematic block diagrams of a base station and a relay station.

A BS 1000 includes a processor 1100, a memory 1200, and a radio frequency (RF) unit 1300. The processor 1100 performs functions such as scheduling a signal transmitted to the RS or the macro UE and generating CC link configuration information to be transmitted to the RS. The memory 1200 connected to the processor 1100 stores various information for driving the processor 1100. The RF unit 1300 connected to the processor 1100 transmits and/or receives radio signals.

An RS 2000 includes a processor 2100, a memory 2200, and an RF unit 2300. The processor 2100 receives the CC link configuration information from the BS, allocates a CC to at least one of a backhaul link between the BS and the RS and an access link between the RS and the RS UE according to the CC link configuration information, and transmits or receives a signal by using the CC in the allocated link.

The memory 2200 connected to the processor 2100 stores various information for driving the processor 2100. The RF unit 2300 connected to the processor 2100 transmits and/or receives radio signals.

The processors 1100 and 2100 may include a chip set, a logical circuit, a data processing device, and/or a converter for converting a baseband signal and a radio signal, respectively. The memories 1200 and 2200 may include a ROM (read-only memory), a RAM (random access memory), a flash memory, a memory card, a storage medium and/or any other storage devices, respectively. The RF units 1300 and 2300 may include one or more antennas transmitting and/or receiving radio signals, respectively. When the embodiment is implemented as software, the above-described techniques may be implemented as modules (processes, functions, etc.) that perform the above-described functions. The modules may be stored in the memories 1200 and 2200 and executed by the processors 1100 and 2100, respectively. The memories 1200 and 2200 may be formed within or outside the processors 1100 and 2100, respectively. The memories 1200 and 2200 may be connected to the processors 1100 and 2100 by various well-known various units, respectively.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

The invention claimed is:

1. A method of using a component carrier by a relay station (RS) in a multi-carrier system, the method comprising:
receiving, through a control channel of a first downlink component carrier from a base station (BS), configuration information indicating whether to allocate a second downlink component carrier either to a backhaul downlink or to an access downlink;
determining whether to allocate the second downlink component carrier either to the backhaul downlink from the BS toward the RS or to the access downlink the RS toward an RS user equipment (UE), according to the configuration information, in turn according to time division multiplexing (TDM) while the first downlink component carrier is dedicated to the backhaul downlink from the BS toward the RS;
determining whether to allocate an uplink component carrier either to a backhaul uplink from the RS toward the BS or to an access uplink from the RS UE toward the RS in turn according to the TDM, wherein when a downlink data is received on the backhaul downlink of the second downlink component carrier from the BS, the uplink component carrier is determined to be allocated to the backhaul uplink thereby transmitting an acknowledgement (ACK)/negative acknowledgement (NACK) for the received downlink data to the BS, wherein when the downlink data is transmitted on the access downlink of the second downlink component carrier to the RS UE, the uplink component carrier is determined to be allocated to the access uplink thereby receiving an ACK/NACK for the transmitted downlink data, and wherein the first downlink component carrier, the second downlink component carrier and the uplink component carrier are different from each other in frequency bands.

2. The method of claim 1, wherein the control channel of the first downlink component carrier is transmitted in an orthogonal frequency division multiplexing (OFDM) symbol following a certain number of first OFDM symbols of a subframe.

3. The method of claim 2, wherein a data channel of the first downlink component carrier is transmitted in an OFDM symbol following the OFDM symbol to which the control channel is allocated.

4. The method of claim 1, wherein the configuration information comprises information indicating that the first downlink component carrier is not used for the access downlink.

5. The method of claim 4, wherein when the configuration information is received, the RS uses the first downlink component carrier only in the backhaul link, and the control channel and a data channel of the first downlink component carrier have the same subframe structure as that of a control channel and a data channel transmitted by the BS to a macro UE.

6. The method of claim 1, wherein the first downlink component carrier and the second downlink component carrier are used for the backhaul downlink of the RS.

7. The method of claim 6, wherein the configuration information comprises information indicating that the first downlink component carrier is not used for the access downlink and information indicating that the second downlink component carrier is not used for the backhaul downlink.

8. The method of claim 7, wherein when the first downlink component carrier is used only for the backhaul downlink and the second downlink component carrier is used only for the access downlink according to the configuration information, the control channel and a data channel transmitted through the first downlink component carrier and the second downlink component carrier have the same subframe structure as the control channel and a data channel transmitted by the BS to a macro UE.

9. The method of claim 6, wherein the configuration information comprises information regarding both the first and second downlink component carrier.

10. The method of claim 6, wherein the control channel of the first downlink component carrier comprises scheduling information regarding a data channel of the first downlink component carrier and a data channel of the second downlink component carrier in the backhaul downlink of the RS.

11. A relay station (RS) used in a multi-carrier system, the RS comprising:
a radio frequency (RF) unit transmitting and receiving a radio signal; and
a processor coupled to the RF unit,
wherein the processor is configured:
to receive, through a control channel of a first downlink component carrier from a base station (BS), configuration information indicating whether to allocate a second downlink component carrier either to a backhaul downlink or to an access downlink;
to determine whether to allocate the second downlink component carrier either to the backhaul downlink from the BS toward the RS or to the access downlink from the RS toward an RS user equipment (UE) according to the configuration information, in turn according to time division multiplexing (TDM) while the first downlink component carrier is dedicated to the backhaul downlink from the BS to the RS; and
to determine whether to allocate an uplink component carrier either to a backhaul uplink from the RS toward the BS or to an access uplink from the RS UE toward the RS in turn according to the TDM, wherein when a downlink data is received on the backhaul downlink of the second downlink component carrier from the BS, the uplink component carrier is determined to be allocated to the backhaul uplink thereby transmitting an acknowledgement (ACK)/negative acknowledgement (NACK) for the received downlink data to the BS, wherein when the downlink data is transmitted on the access downlink of the second downlink component carrier to the RS UE, the uplink component carrier is determined to be allocated to the access uplink thereby receiving an ACK/NACK for the transmitted downlink data, and wherein the first downlink component carrier, the second downlink component carrier and the uplink component carrier are different from each other in frequency bands.

* * * * *